US010732759B2

(12) United States Patent
Hinckley et al.

(10) Patent No.: US 10,732,759 B2
(45) Date of Patent: Aug. 4, 2020

(54) PRE-TOUCH SENSING FOR MOBILE INTERACTION

(71) Applicant: Microsoft Technology Licensing, LLC, Redmond, WA (US)

(72) Inventors: Kenneth P. Hinckley, Redmond, WA (US); Michel Pahud, Kirkland, WA (US); Hrovje Benko, Seattle, WA (US); William Arthur Stewart Buxton, Toronto (CA); Seongkook Heo, Busan (KR)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/199,623

(22) Filed: Jun. 30, 2016

(65) Prior Publication Data

US 2018/0004386 A1 Jan. 4, 2018

(51) Int. Cl.
*G06F 3/0488* (2013.01)
*G06F 3/041* (2006.01)
(Continued)

(52) U.S. Cl.
CPC .......... *G06F 3/0416* (2013.01); *G06F 3/0482* (2013.01); *G06F 3/04883* (2013.01);
(Continued)

(58) Field of Classification Search
CPC .... G06F 3/0488; G06F 3/0346; G06F 3/0416; G06F 3/0484; G06F 2203/04104;
(Continued)

(56) References Cited

U.S. PATENT DOCUMENTS

| 8,614,693 B2 | 12/2013 | King et al. |
| 8,913,019 B2 | 12/2014 | Zhao et al. |

(Continued)

FOREIGN PATENT DOCUMENTS

| WO | 2015023136 A1 | 2/2015 |
| WO | 2015112405 A1 | 7/2015 |

OTHER PUBLICATIONS

Taylor, et al., "Graspables: Grasp-Recognition as a User Interface", In Proceedings of the SIGCHI Conference on Human Factors in Computing Systems, Apr. 7, 2009, pp. 917-925.
(Continued)

*Primary Examiner* — Yaron Cohen
(74) *Attorney, Agent, or Firm* — Medley, Behrens & Lewis, LLC

(57) ABSTRACT

Various technologies described herein pertain to utilizing sensed pre-touch interaction to control a mobile computing device. A pre-touch interaction of a user with the mobile computing device is detected. The pre-touch interaction includes a grip of the user on the mobile computing device and/or a hover of one or more fingers of the user with respect to a touchscreen of the mobile computing device. The finger(s) of the user can be within proximity but not touching the touchscreen as part of the hover. Parameter(s) of the pre-touch interaction of the user with the mobile computing device are identified, and a touch of the user on the touchscreen of the mobile computing device is detected. A computing operation is executed responsive to the touch, where the computing operation is based on the touch and the parameter(s) of the pre-touch interaction of the user with the mobile computing device.

20 Claims, 17 Drawing Sheets

(51) Int. Cl.
*G06F 3/0346* (2013.01)
*G06F 3/0484* (2013.01)
*G06F 3/0482* (2013.01)
*G06F 3/044* (2006.01)

(52) U.S. Cl.
CPC .... *G06F 3/044* (2013.01); *G06F 2203/04108* (2013.01); *G06F 2203/04808* (2013.01)

(58) Field of Classification Search
CPC ....... G06F 2203/04108; G06F 3/04883; G06F 3/0482; G06F 2203/04808; G06F 3/044
See application file for complete search history.

(56) References Cited

U.S. PATENT DOCUMENTS

| | | | |
|---|---|---|---|
| 8,963,859 B2 | 2/2015 | Wang | |
| 9,201,520 B2 | 12/2015 | Benko et al. | |
| 2009/0289914 A1 | 11/2009 | Cho | |
| 2010/0085317 A1* | 4/2010 | Park | G06F 1/1626 345/173 |
| 2014/0085260 A1 | 3/2014 | Guarneri et al. | |
| 2014/0327614 A1 | 11/2014 | Park | |
| 2014/0351768 A1 | 11/2014 | Park | |
| 2015/0103002 A1 | 4/2015 | Yoon et al. | |
| 2015/0109257 A1* | 4/2015 | Jalali | G06F 3/0488 345/175 |
| 2015/0134572 A1 | 5/2015 | Forlines et al. | |
| 2016/0313890 A1* | 10/2016 | Walline | G06F 3/04812 |
| 2016/0334936 A1* | 11/2016 | Obata | G06F 3/041 |

OTHER PUBLICATIONS

Vogel, et al., "Occlusion-Aware Interfaces", In Proceedings of the SIGCHI Conference on Human Factors in Computing Systems, Apr. 10, 2010, pp. 263-272.
Wigdor, et al., "Brave NUI World: Designing Natural User Interfaces for Touch and Gesture", In Publication of Morgan Kaufmann, Apr. 13, 2011, 253 pages.
Wimmer, et al., "HandSense: discriminating different ways of grasping and holding a tangible user interface", In Proceedings of the 3rd International Conference on Tangible and Embedded Interaction, Feb. 16, 2009, pp. 359-362.
Wolf, et al., "A Taxonomy of Microinteractions: Defining Microgestures based on Ergonomic and Scenario-dependent Requirements", In Proceedings of the 13th IFIP TC 13 international conference on Human-computer interaction—vol. Part I, Sep. 5, 2011, 18 pages.
Xia, et al., "Zero-Latency Tapping: Using Hover Information to Predict Touch Locations and Eliminate Touchdown Latency", In Proceedings of the 27th annual ACM symposium on User interface software and technology, Oct. 5, 2014, pp. 205-214.
Yang, et al., "TouchCuts and TouchZoom: Enhanced Target Selection for Touch Displays using Finger Proximity Sensing", In Proceedings of the SIGCHI Conference on Human Factors in Computing Systems, May 7, 2011, pp. 2585-2594.
Ziegler, Chris, "Apple brings 3D Touch to the iPhone 6S", Published on: Sep. 9, 2015, Available at: <<http://www.theverge.com/2015/9/9/9280599/apple-iphone-6s-3d-touch-display-screen-technology>>, 3 pages.
"Escape from Flatland", Published on: Sep. 5, 2015, Available at: <<http://www.economist.com/news/technology-quarterly/21662645-touchscreens-multiple-finger-and-hand-gestures-above-and-around-well>>, 3 pages.
Lee, et al., "New Mobile UI with Hand-Grip Recognition", In Proceedings of Extended Abstracts on Human Factors in Computing, Apr. 4, 2009, pp. 3521.
McGrath, et al., "Detecting Tapping Motion on the Side of Mobile Devices by Probabilistically Combining Hand Postures", In Proceedings of the 27th annual ACM symposium on User interface software and technology, Oct. 5, 2014, pp. 215-219.

Song, et al., "Grips and Gestures on a Multi-Touch Pen", In Proceedings of the SIGCHI Conference on Human Factors in Computing Systems, May 7, 2011, pp. 1323-1332.
Annett, et al., "Exploring and Understanding Unintended Touch during Direct Pen Interaction", In Journal of ACM Transactions on Computer-Human Interaction, vol. 21, Issue 5, Nov. 2014, 39 pages.
Bellotti, et al., "Making sense of sensing systems: five questions for designers and researchers", In Proceedings of the SIGCHI Conference on Human Factors in Computing Systems, vol. No. 1, Issue No. 1, Apr. 20, 2002, pp. 415-422.
Bergstrom-Lehtovirta, et al., "Modeling the functional area of the thumb on mobile touchscreen surfaces", In Proceedings of the SIGCHI Conference on Human Factors in Computing Systems, Apr. 26, 2014, pp. 1991-2000.
Buxton, William., "Chunking and Phrasing and the Design of Human-Computer Dialogues", In Proceedings of the IFIP World Computer Congress, Sep. 1986, pp. 1-9.
Buxton, William., "Integrating the Periphery and Context: A New Taxonomy of Telematics", In Proceedings of Graphics Interface, vol. 95, Apr. 1, 1995, 8 pages.
Buxton, William A.S., "A three-state model of graphical input", In Proceedings of the IFIP TC13 Third Interational Conference on Human-Computer Interaction, Aug. 27, 1990, pp. 1-11.
Chen, et al., "Air+touch: interweaving touch & in-air gestures", In Proceedings of the 27th annual ACM symposium on User interface software and technology, Oct. 5, 2014, pp. 519-525.
Cheng, et al., "IrotateGrasp: automatic screen rotation based on grasp of mobile devices", In Proceedings of the SIGCHI Conference on Human Factors in Computing Systems, Apr. 27, 2013, pp. 3051-3054.
Cheng, et al., "iGrasp: grasp-based adaptive keyboard for mobile devices", In Proceedings of the SIGCHI Conference on Human Factors in Computing Systems, Apr. 27, 2013, pp. 3037-3046.
Cheung, et al., "Revisiting hovering: interaction guides for interactive surfaces", In Proceedings of the ACM international conference on Interactive tabletops and surfaces, Nov. 11, 2012, pp. 355-358.
Creem, et al., "Grasping objects by their handles: A necessary interaction between cognition and action", In Journal of Experimental Psychology: Human Perception and Performance, vol. 27, Feb. 2001, pp. 218-228.
Dietz, et al., "A practical pressure sensitive computer keyboard", In Proceedings of the 22nd annual ACM symposium on User interface software and technology, Oct. 4, 2009, pp. 55-58.
"Fogale Sensation", Retrieved on: Dec. 22, 2015, Available at: <<http://www.fogale-sensation.com/technology>>, 6 pages.
Goel, et al., "ContextType: Using Hand Posture Information to Improve Mobile Touch Screen Text Entry", In Proceedings of SIGCHI Conference on Human Factors in Computing Systems, Apr. 27, 2013, pp. 2795-2798.
Goel, et al., "GripSense: Using Built-In Sensors to Detect Hand Posture and Pressure on Commodity Mobile Phones", In Proceedings of 25th Annual ACM Symposium on User Interface Software and Technology, Oct. 7, 2012, pp. 545-554.
Grossman, et al., "A Probabilistic Approach to Modeling Two-Dimensional Pointing", In Journal of ACM Transactions on Computer-Human Interaction, vol. 12, Issue 3, Sep. 2005, pp. 435-459.
Grossman, et al., "Hover Widgets: Using the Tracking State to Extend the Capabilities of Pen-Operated Devices", In Proceedings of SIGCHI Conference on Human Factors in Computing System, Apr. 22, 2006, pp. 861-870.
Guiard, Yves, "Asymmetric Division of Labor in Human Skilled Bimanual Action: The Kinematic Chain as a Model", In Journal of Motor Behavior, vol. 19, No. 4, Dec. 1987, 23 pages.
Harrison, et al., "Squeeze Me, Hold Me, Tilt Me! An Exploration of Manipulative User Interfaces", In Proceedings of SIGCHI Conference on Human Factors in Computing Systems, Apr. 18, 1998, pp. 17-24.
Heo, et al., "Force Gestures: Augmenting Touch Screen Gestures with Normal and Tangential Forces", In Proceedings of 24th Annual ACM Symposium on User Interface Software and Technology, Oct. 16, 2011, pp. 621-626.

(56) References Cited

OTHER PUBLICATIONS

Herot, et al., "One-Point Touch Input of Vector Information from Computer Displays", In Proceedings of 5th Annual Conference on Computer Graphics and Interactive Techniques, Aug. 23, 1978, pp. 210-216.

Hilliges, et al., "Interactions in the Air: Adding Further Depth 12 to Interactive Tabletops", In Proceedings of 22nd Annual ACM Symposium on User Interface Software and Technology, Oct. 4, 2009, pp. 139-148.

Hinckley, et al., "Foreground and Background Interaction with Sensor-Enhanced Mobile Devices", In Journal of ACM Transactions on Computer-Human Interaction, vol. 12, Issue 1, Mar. 2005, pp. 31-52.

Holz, et al., "The Generalized Perceived Input Point Model and How to Double Touch Accuracy by Extracting Fingerprints", In Proceedings of SIGCHI Conference on Human Factors in Computing Systems, Apr. 10, 2010, pp. 581-590.

Jackson, et al., "Nailing Down Multi-Touch: Anchored Above the Surface Interaction for 3D Modeling and Navigation", In Proceedings of Graphics Interface Conference, May 28, 2012, pp. 181-184.

Karlson, et al., "Understanding Single-Handed Mobile Device Interaction", In Journal of Handbook of Research on User Interface Design and Evaluation for Mobile Technology, Jan. 2006, 8 pages.

Kim, et al., "Action-Transferred Navigation Technique Design Approach Supporting Human Spatial Learning", In Journal of Transactions on Computer-Human Interaction, vol. 22, Issue 6, Sep. 2015, 42 pages.

Kim, et al., "Hand Grip Pattern Recognition for Mobile User Interfaces", In Proceedings of the 18th Conference on Innovative Applications of Artificial Intelligence, vol. 2, Jul. 16, 2006, pp. 1789-1794.

Kratz, et al., "HoverFlow: Expanding the Design Space of Around-Device Interaction", In Proceedings of the 11th International Conference on Human-Computer Interaction with Mobile Devices and Services, Sep. 15, 2009, 8 pages.

Li, et al., "Experimental Analysis of Mode Switching Techniques in Pen-based User Interfaces", In Proceedings of the SIGCHI Conference on Human Factors in Computing Systems, Apr. 2, 2005, pp 461-470.

Liu, et al., "FlexAura: A Flexible Near-Surface Range Sensor", In Proceedings of the 25th Annual ACM Symposium on User Interface Software and Technology, Oct. 7, 2012, pp. 327-330.

Tang, et al., "Video Whiteboard: Video Shadows to Support Remote Collaboration", In Proceedings of the SIGCHI Conference on Human Factors in Computing Systems, Apr. 27, 1991, pp. 315-322.

Marquardt, et al., "The Continuous Interaction Space: Interaction Techniques Unifying Touch and Gesture on and Above a Digital Surface", In Proceedings of the 13th IFIP TC 13 international conference on Human-computer interaction—vol. Part III, Sep. 5, 2011, 16 pages.

Marteniuk, et al., "Constraints on Human Arm Movement Trajectories", In Canadian Journal of Psychology, vol. 41, Issue 3, Sep. 1987, pp. 365-378.

Meyer, et al., "Optimality in Human Motor Performance: Ideal Control of Rapid Aimed Movement", In Journal of Psychological Review, vol. 95, Issue 3, Jul. 1988, pp. 340-370.

Negulescu, et al., "Grip Change as an Information Side Channel for Mobile Touch Interaction", In Proceedings of the 33rd Annual ACM Conference on Human Factors in Computing Systems, Apr. 18, 2015, pp. 1519-1522.

Noor, et al., "28 Frames Later Predicting Screen Touches From Back-of-Device Grip Changes", In Proceedings of the SIGCHI Conference on Human Factors in Computing Systems, Apr. 26, 2014, pp. 2005-2008.

Olafsdotti, et al., "Prospective Motor Control on Tabletops: Planning Grasp for Multitouch Interaction", In Proceedings of the SIGCHI Conference on Human Factors in Computing Systems, Apr. 26, 2014, pp. 2893-2902.

Pohl, et al., "Focused and Casual Interactions: Allowing Users to Vary Their Level of Engagement", In Proceedings of the SIGCHI Conference on Human Factors in Computing Systems, Apr. 27, 2013, pp. 2223-2232.

McGuffin, et al., "Fitts' Law and Expanding Targets: Experimental Studies and Designs for User Interfaces", In Journal of Transactions on Computer-Human Interaction, vol. 12, Issue 4, Dec. 2005, pp. 388-422.

Rogers, et al., "AnglePose: Robust, Precise Capacitive Touch Tracking via 3D Orientation Estimation", In Proceedings of the SIGCHI Conference on Human Factors in Computing Systems, May 7, 2011, pp. 2575-2584.

"Samsung. How Do I Use Air Gestures?", Retrieved on: Dec. 23, 2015, Available at: <<http://www.samsung.com/us/support/howtoguide/N0000003/10141/120552>>, 10 pages.

Song, et al., "In-air Gestures Around Unmodified Mobile Devices", In Proceedings of the 27th annual ACM symposium on User interface software and technology, Oct. 5, 2014, pp. 319-329.

"Xperia Sola with Floating Touch", Retrieved on: Dec. 23, 2015, Available at: <<http://developer.sonymobile.com/knowledgebase/technologies/floating-touch/>>, 3 pages.

Tang, et al., "Three's Company: Understanding Communication Channels in Three-way Distributed Collaboration", In Proceedings of the ACM conference on Computer supported cooperative work, Feb. 6, 2010, pp. 271-280.

"Non Final Office Action Issued in U.S Appl. No. 15/437,374", dated Aug. 21, 2019, 23 Pages.

"Final Office Action Issued in U.S. Appl. No. 15/437,374", dated Jan. 27, 2020, 25 Pages.

* cited by examiner

PRE-TOUCH SENSING FOR MOBILE INTERACTION

BACKGROUND

Mobile computing devices oftentimes include touchscreens. A touchscreen is an input device that can display a graphical user interface. The touchscreen can receive an input for the mobile computing device by sensing a touch of a finger, stylus, or the like on the touchscreen. The user can employ the touchscreen to react to content displayed thereupon and control how the content is displayed. Thus, the touchscreen enables the user to interact directly with the content displayed rather than utilizing some other type of input device, such as a mouse, keyboard, touchpad, or the like, to interact with the content.

Input received via touchscreens is oftentimes based on discrete state transitions defined by an on-screen, two dimensional view of a human hand. A computing operation can be controlled responsive to a touch of a finger (or fingers) of a user on a surface of the touchscreen. For instance, an application can be started responsive to detection of a finger touching an icon displayed as part of a graphical user interface on the touchscreen. However, in contrast to discrete state transitions typically effectuated based on the on-screen, two dimensional view of the human hand, natural human grasping behavior is typically analog and continuous.

SUMMARY

Described herein are various technologies that pertain to utilizing sensed pre-touch interaction to control a mobile computing device. A pre-touch interaction of a user with the mobile computing device can be detected. The pre-touch interaction can include a grip of the user on the mobile computing device and/or a hover of one or more fingers of the user with respect to a touchscreen of the mobile computing device. The one or more fingers of the user can be within proximity but not touching the touchscreen as part of the hover. Moreover, one or more parameters of the pre-touch interaction of the user with the mobile computing device can be identified. Examples of the parameters of the pre-touch interaction can include whether the mobile computing device is gripped by the user, whether the mobile computing device is gripped by the user in one hand or two hands, an identity of a hand in which the mobile computing device is gripped by the user, a number of fingers hovering within proximity of the touchscreen, a location on the touchscreen above which a fingertip of a particular finger of the user is hovering, an altitude of the particular finger of the user above the touchscreen, a posture of the particular finger of the user, an approach trajectory of the particular finger of the user, and so forth. Further, a touch of the user on the touchscreen of the mobile computing device can be detected. A computing operation can be executed responsive to the touch. The computing operation can be based on the touch and the one or more parameters of the pre-touch interaction of the user with the mobile computing device.

According to various embodiments, the parameter(s) of the pre-touch interaction of the user with the mobile computing device can be utilized for anticipatory reactions prior to the detection of the touch. Thus, prior to the touch, a graphical user interface displayed on the touchscreen can be modified based on the parameter(s) of the pre-touch interaction of the user with the mobile computing device. The graphical user interface as modified can include a control that causes execution of the computing operation. Moreover, the detected touch can correspond to the control that causes execution of the computing operation.

In accordance with various embodiments, the parameter(s) of the pre-touch interaction of the user with the mobile computing device can be employed to provide retroactive interpretations of the touch of the user on the touchscreen of the mobile computing device. The touch can be disambiguated based on the parameter(s) of the pre-touch interaction. Accordingly, the computing operation can be executed responsive to the touch, where the computing operation is based on the touch as disambiguated. For instance, a type of gesture of which the touch is part, a particular graphical target included in a graphical user interface intended to be touched, or the like can be detected based on the parameter(s) of the pre-touch interaction.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
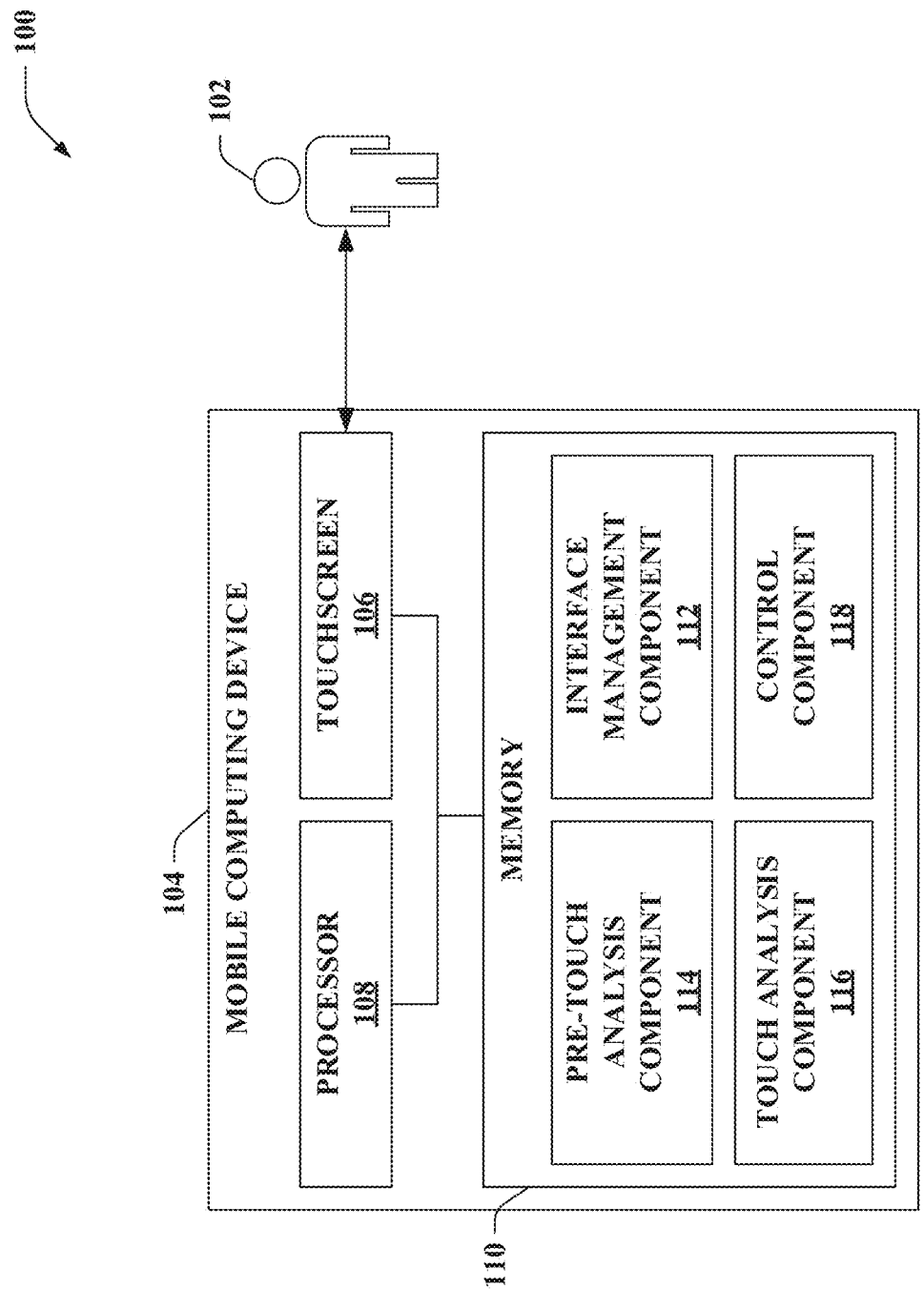
FIG. 1 illustrates a functional block diagram of an exemplary system that senses a pre-touch interaction of a user with a mobile computing device for controlling execution of a computing operation performed by the mobile computing device.

Various technologies pertaining to employing a sensed pre-touch interaction of a user with a mobile computing device to control the mobile computing device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that senses a pre-touch interaction of a user 102 with a mobile computing device 104 for controlling execution of a computing operation performed by the mobile computing device 104. The mobile computing device 104 includes a touchscreen 106. Moreover, the mobile computing device 104 can detect the pre-touch interaction of the user 102. The pre-touch interaction can include a grip of the user 102 on the mobile computing device 104. The grip can include a finger or fingers of the user 102 around an edge (or edges) of a housing of the mobile computing device 104. The grip can also include a hand or hands of the user 102 that support the housing of the mobile computing device 104 (e.g., the hand or hands of the user 102 can support edge(s) of the housing of the mobile computing device 104 and/or a back of the housing of the mobile computing device 104 opposite the touchscreen 106). The pre-touch interaction can additionally or alternatively include a hover of one or more fingers of the user 102 with respect to the touchscreen 106 of the mobile computing device 104. Accordingly, the grip of the user 102 on the mobile computing device 104 and/or the one or more fingers hovering above the touchscreen 106 can be sensed. Further, the pre-touch interaction can be utilized to control the computing operation performed by the mobile computing device 104.

Examples of the mobile computing device 104 include a mobile telephone, a tablet computing device, a smartphone, a wearable computing device, a handheld computing device, a portable gaming device, a personal digital assistant, and the like. The mobile computing device 104 includes at least one processor 108 and memory 110. The processor 108 is configured to execute instructions loaded into the memory 110 (e.g., one or more systems loaded into the memory 110 are executable by the processor 108, one or more components loaded into the memory 110 are executable by the processor 108). As described in greater detail herein, the memory 110 includes instructions for detecting a pre-touch interaction of the user 102 with the mobile computing device 104 and executing a computing operation responsive to a touch, where the computing operation is based on parameter(s) of the pre-touch interaction of the user 102 with the mobile computing device 104.

The memory 110 can include an interface management component 112 configured to control a graphical user interface displayed on the touchscreen 106. The graphical user interface displayed by the interface management component 112 can include substantially any type of content (e.g., text, video, images). Moreover, the graphical user interface controlled by the interface management component 112 can include various interactive elements that can be operated upon by the user 102 (e.g., the graphical user interface can include controls, user interface affordances, etc.).

The memory 110 can further include a pre-touch analysis component 114 configured to detect a pre-touch interaction of the user 102 with the mobile computing device 104. The pre-touch interaction detected by the pre-touch analysis component 114 can include a grip of the user 102 on the mobile computing device 104 (e.g., the grip on the housing of the mobile computing device 104). The pre-touch analysis component 114 can detect the grip of the user 102 on the mobile computing device 104 prior to a touch of the user 102 on the touchscreen 106 (e.g., the grip can be detected while the user 102 is not touching the touchscreen 106). Additionally or alternatively, the pre-touch interaction detected by the pre-touch analysis component 114 can include a hover of one or more fingers of the user 102 with respect to the touchscreen 106. The finger(s) of the user can be within proximity but not touching the touchscreen 106 as part of the hover detected by the pre-touch analysis component 114. Moreover, the pre-touch analysis component 114 can detect the hover of the finger(s) prior to the touch of the user 102 on the touchscreen 106 (e.g., the hover can be detected while the user 102 is not touching the touchscreen 106).

The pre-touch analysis component 114 can further be configured to identify one or more parameters of the pre-touch interaction of the user 102 with the mobile computing device 104. For instance, the pre-touch analysis component 114 can identify grip parameter(s) of the grip of the user 102 on the mobile computing device 104. Additionally, or alternatively, the pre-touch analysis component 114 can identify hover parameter(s) of the hover of the finger(s) of the user 102 with respect to touchscreen 106.

Pursuant to various examples, the grip parameter(s) can specify whether the mobile computing device 104 is gripped by the user 102, whether the mobile computing device 104 is gripped by the user 102 in one hand or two hands, an identity of a hand in which the mobile computing device 104 is gripped by the user 102 (e.g., right hand, left hand), a combination thereof, and so forth. Moreover, according to various examples, the hover parameter(s) can specify a number of fingers hovering within proximity of the touchscreen 106, a location on the touchscreen 106 above which a fingertip of a particular finger of the user 102 is hovering, an altitude of the particular finger of the user above the touchscreen 106, a posture of the particular finger of the user, an approach trajectory of the particular finger the user (e.g., change in location and/or altitude over time), a combination thereof, and so forth. It is to be appreciated that the hover parameter(s) can specify the location, altitude, posture, approach trajectory, etc. for each finger detected to be hovering within proximity of the touchscreen 106.

The memory 110 further includes a touch analysis component 116 configured to detect a touch of the user 102 on the touchscreen 106 of the mobile computing device 104. The touch analysis component 116 can detect a location on the touchscreen 106 of the touch, an area of contact on the touchscreen 106 of the touch, a duration of the touch on the touchscreen 106, movement of the touch across the touchscreen 106, and so forth.

The memory 110 further includes a control component 118 configured to execute a computing operation responsive to the touch detected by the touch analysis component 116. The computing operation can be based on the touch and the parameter(s) of the pre-touch interaction of the user 102 with the mobile computing device 104 as identified by the pre-touch analysis component 114.

According to an example, the pre-touch analysis component 114 can detect a grip of the user 102 on the mobile computing device 104 prior to a touch of the user 102 on the touchscreen 106 of the mobile computing device 104. The pre-touch analysis component 114 can further identify a grip parameter of the grip of the user 102 on the mobile computing device 104. Moreover, the touch analysis component 116 can thereafter detect the touch of the user 102 on the touchscreen 106 of the mobile computing device 104, and the control component 118 can execute the computing operation responsive to the touch. Pursuant to this example, the computing operation can be based on the touch and the grip parameter.

According to another example, the pre-touch analysis component 114 can detect a hover of one or more fingers of the user 102 with respect to the touchscreen 106 prior to a touch of the user 102 on the touchscreen 106. The pre-touch analysis component 114 can further identify a hover parameter of the hover of the finger(s) of the user 102 with respect the touchscreen 106. Again, the touch analysis component 116 can subsequently detect the touch of the user 102 on the touchscreen 106 of the mobile computing device 104, and the control component 118 can execute the computing operation responsive to the touch. Pursuant to this example, the computing operation can be based on the touch and the hover parameter.

In accordance with yet another example, the pre-touch analysis component 114 can detect a grip of the user 102 on the mobile computing device 104 prior to a touch of the user 102 on the touchscreen 106 of the mobile computing device 104. The pre-touch analysis component 114 can further detect a hover of one or more fingers of the user 102 with respect to the touchscreen 106 prior to the touch of the user 102 on the touchscreen 106. The pre-touch analysis component 114 can identify a grip parameter of the grip of the user 102 on the mobile computing device 104 and a hover parameter of the hover of the finger(s) of the user 102 with respect to the touchscreen 106. The touch analysis component 116 can thereafter detect the touch of the user 102 on the touchscreen 106 of the mobile computing device 104 and the control component 118 can execute the computing operation responsive to the touch. The computing operation, pursuant to this example, can be based on the touch, the grip parameter, and the hover parameter.

Conventional approaches oftentimes employ detected touch on a touchscreen to effectuate a computing operation. However, such conventional approaches typically fail to consider a context of the touch on the two-dimensional surface of the touchscreen. For instance, traditional techniques typically do not consider the context before contact beyond the confines of the touchscreen. By way of illustration, a user may first grip a mobile computing device with his or her left-hand or right-hand. Then, the user may reach for the touchscreen of the mobile computing device (e.g., with an index finger, with a thumb of a hand holding the mobile computing device, with multiple fingers). As the finger(s) approach the touchscreen, finger posture(s) and/or approach trajectory (or approach trajectories) of the approaching finger(s) can imply intent of the user, indicate intended graphical target(s) intended to be touched by the user, and so forth. Such contextual detail can be referred to as pre-touch and is traditionally not considered as part of traditional mobile interaction.

Sensing of the pre-touch interaction of the user 102 above and around the touchscreen 106 can provide contextual insights as to the interaction between the user 102 and the mobile computing device 104. The pre-touch interaction can take place before or in conjunction with actual touch(es) on the touchscreen 106 (in contrast to after-touch interaction or in-air suffixes or gestures). Utilization of contextual information concerning the touch of the user 102 based on the parameter(s) of the pre-touch interaction is distinguishable from conventional hover approaches, which commonly track a single point (cursor) to provide a discrete state. Moreover, the utilization of the contextual information as set forth herein is distinguishable from traditional in-air gestures, which can be overt actions. Rather, as described herein, the parameter(s) of the pre-touch interaction can be employed to support context-driven interpretations.

According to an example, the parameter(s) of the pre-touch interaction of the user 102 with the mobile computing device 104 can be utilized for an anticipatory reaction prior to the touch being detected by the touch analysis component 116. Following this example, the interface management component 112 can modify the graphical user interface based on the parameter(s) of the pre-touch interaction. Prior to the touch, the interface management component 112 can modify the graphical user interface displayed on the touchscreen 106 based on the parameter(s) of the pre-touch interaction of the user 102 with the mobile computing device 104. The graphical user interface as modified can include a control that causes execution of the computing operation. Thus, such control, responsive to detection of the touch by the touch analysis component 116, can cause the computing operation to be executed by the control component 118.

As part of the anticipatory reactions, the interface management component 112 can modify the graphical user interface based on an approach of one or more fingers of the user 102 and/or the grip of the user 102 on the mobile computing device 104. By way of illustration, a set of controls can be faded into the graphical user interface by the interface management component 112 prior to the touch and in response to the parameter(s) of the pre-touch interaction specifying that one or more fingers are approaching the touchscreen 106. Further following this illustration, the set of controls can be faded out when the one or more fingers move away from the touchscreen 106. The controls can be context sensitive such that their presentation by the interface management component 112 can depend on the grip, the direction from which the fingers approach, the number of fingers hovering above the touchscreen 106, and so forth.

Note that such appearance or disappearance (fade in or fade out or other transition) behaviors may be based on animations triggered by finger(s) coming into or moving out of proximity of the touchscreen 106, or, alternatively, proportional to the approach speed and trajectory of the finger(s) themselves. Moreover, it is to be appreciated that the appearance or disappearance behaviors can be based on a type of finger and/or object approaching the touchscreen 106 (e.g., a thumb and an index finger move differently resulting in different approach speeds).

Pursuant to another example, the parameter(s) of the pre-touch interaction of the user 102 with the mobile computing device 104 can be utilized to retroactively interpret a touch event. Thus, the touch can be disambiguated (e.g., subsequent to the touch, simultaneously with the touch) based on the parameter(s) of the pre-touch interaction of the user 102 with the mobile computing device 104. The computing operation executed by the control component 118 can be based on the touch as disambiguated. The touch, for instance, can be construed based on how the user 102 approached the touchscreen 106. According to an illustration, the touch can be disambiguated based on whether a finger that touched the touchscreen 106 approached in a ballistic motion or with a trajectory that was adjusted prior to contact.

The mobile computing device 104 can further support hybrid touch and hover gestures, which can combine on-screen touch with above-screen aspects. For instance, as part of a hybrid touch and hover gesture, an object can be selected with a thumb while an index finger can be moved into range of the touchscreen 106 to call up a menu. Utilization of such gestures can enable contextual options to be revealed without utilizing a timeout, with the options being presented on the touchscreen 106 in a position corresponding to a location of the hovering finger(s). The hybrid touch and hover gestures can further be based on grip sensing in the background of the interaction to support degradation to a one-handed version of the technique when one hand of the user is detected to be holding the mobile computing device 104 and touching the touchscreen 106.

It is to be appreciated that substantially any type of touchscreen 106 is intended to fall within the scope of the hereto appended claims. According to an example, the touchscreen 106 can be a self-capacitance touchscreen with a matrix of sensors. Following this example, the self-capacitance touchscreen can sense a respective capacitance for each cell of the matrix. Presence of a fingertip can be sensed above the self-capacitance touchscreen within a predetermined range. For instance, a capacitance value proportional to height (and volume) of an object above the self-capacitance touchscreen can be sensed, and an altitude of a particular finger of the user 102 above the self-capacitance touchscreen can be determined based on the sensed capacitance value. The self-capacitance touchscreen can further sense the grip of the user 102 (e.g., finger(s) close to edge(s) of the self-capacitance touchscreen can be sensed). Hybrids of such self-capacitance touchscreens with more traditional projective-capacitive designs (which typically suppress stray capacitance signals from a hovering finger), or other sensing technologies, such as in-cell (per-pixel) infrared range sensing, are also possible and intended to fall within the scope of the hereto appended claims.

According to an example (e.g., the touchscreen 106 is a self-capacitance touchscreen), the pre-touch interaction of the user 102 with the mobile computing device 104 can be detected by the pre-touch analysis component 114 based on sensed data obtained by the touchscreen 106. Further following this example, the touch of the user 102 can be detected by the touch analysis component 116 based on the sensed data obtained by the touchscreen 106. However, it is to be appreciated that the claimed subject matter is not limited to the foregoing example, as other types of touchscreens as well as use of other types of sensors in conjunction with the touchscreen 106 are intended to fall within the scope of the hereto appended claims.

Figure 2:
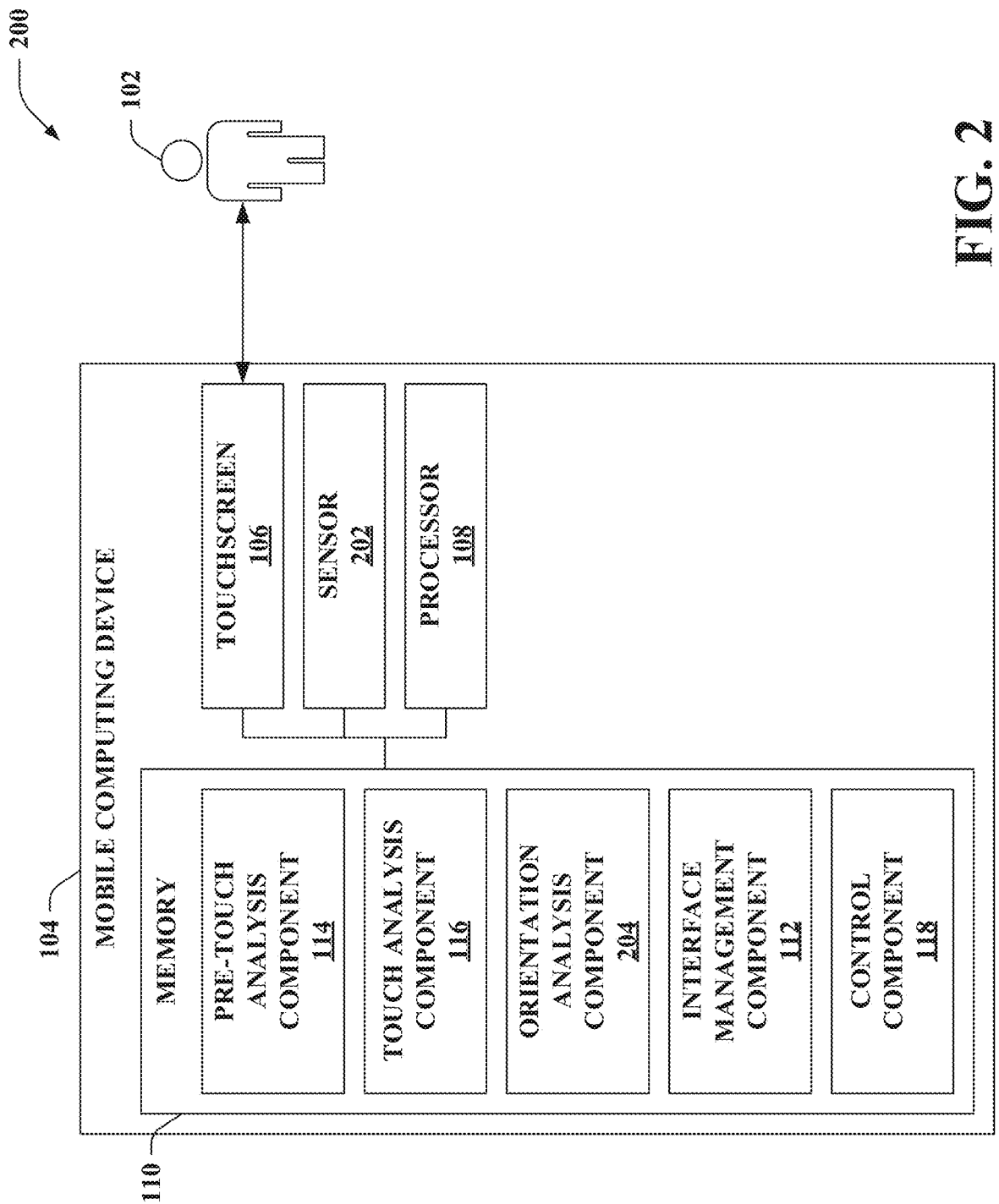
FIG. 2 illustrates a functional block diagram of another exemplary system that senses pre-touch interactions of the user with the mobile computing device to control execution of computing operations responsive to touch.

Now turning to FIG. 2, illustrated is another system 200 that senses pre-touch interactions of the user 102 with the mobile computing device 104 to control execution of computing operations responsive to touch. The system 200 includes the mobile computing device 104, which further includes the touchscreen 106, at least one processor 108, and the memory 110. Similar to the example set forth in FIG. 1, the memory 110 can include the pre-touch analysis component 114, the touch analysis component 116, the interface management component 112, and the control component 118.

The mobile computing device 104 can further include a sensor 202 (or a plurality of sensors). In the example shown in FIG. 2, the sensor 202 can be separate from the touchscreen 106. Various types of sensors 202 are intended to fall within the scope of the hereto appended claims. The sensor 202, for instance, can provide inertial sensing capabilities. Thus, the sensor 202 can be or include an accelerometer, a gyroscope, a magnetometer, a combination thereof, and so forth. According to another example, the sensor 202 can be or include a grip sensor (e.g., separate from the touchscreen 106), which can obtain sensed data pertaining to the grip of the user 102 on the sides or the back of the housing of the mobile computing device 104. Pursuant to another example, it is contemplated that the sensor 202 can include one or more cameras.

The sensor 202 can obtain sensed data concerning the grip, hover, touch, a combination thereof, etc. of the user 102. According to an example, the pre-touch analysis component 114 can detect the pre-touch interaction of the user with the mobile computing device 104 based on the sensed data obtained by the sensor 202. It is to be appreciated that the touch analysis component 116 can detect the touch of the user 102 on the touchscreen 106 based on sensed data obtained by the touchscreen 106 and/or the sensor 202.

Moreover, the memory 110 can include an orientation analysis component 204 configured to detect a physical orientation (e.g., three-dimensional orientation) of the mobile computing device 104. The physical orientation can be detected by the orientation analysis component 204 utilizing sensed data obtained by the sensor 202 (e.g., the sensor 202 can provide inertial sensing capabilities). According to an example, the grip of the user can be inferred based on the physical orientation of the mobile computing device 104; yet, the claimed subject matter is not so limited. The computing operation executed by the control component 118 of the mobile computing device 104 can further be based on the physical orientation of the mobile computing device 104.

Figure 3:
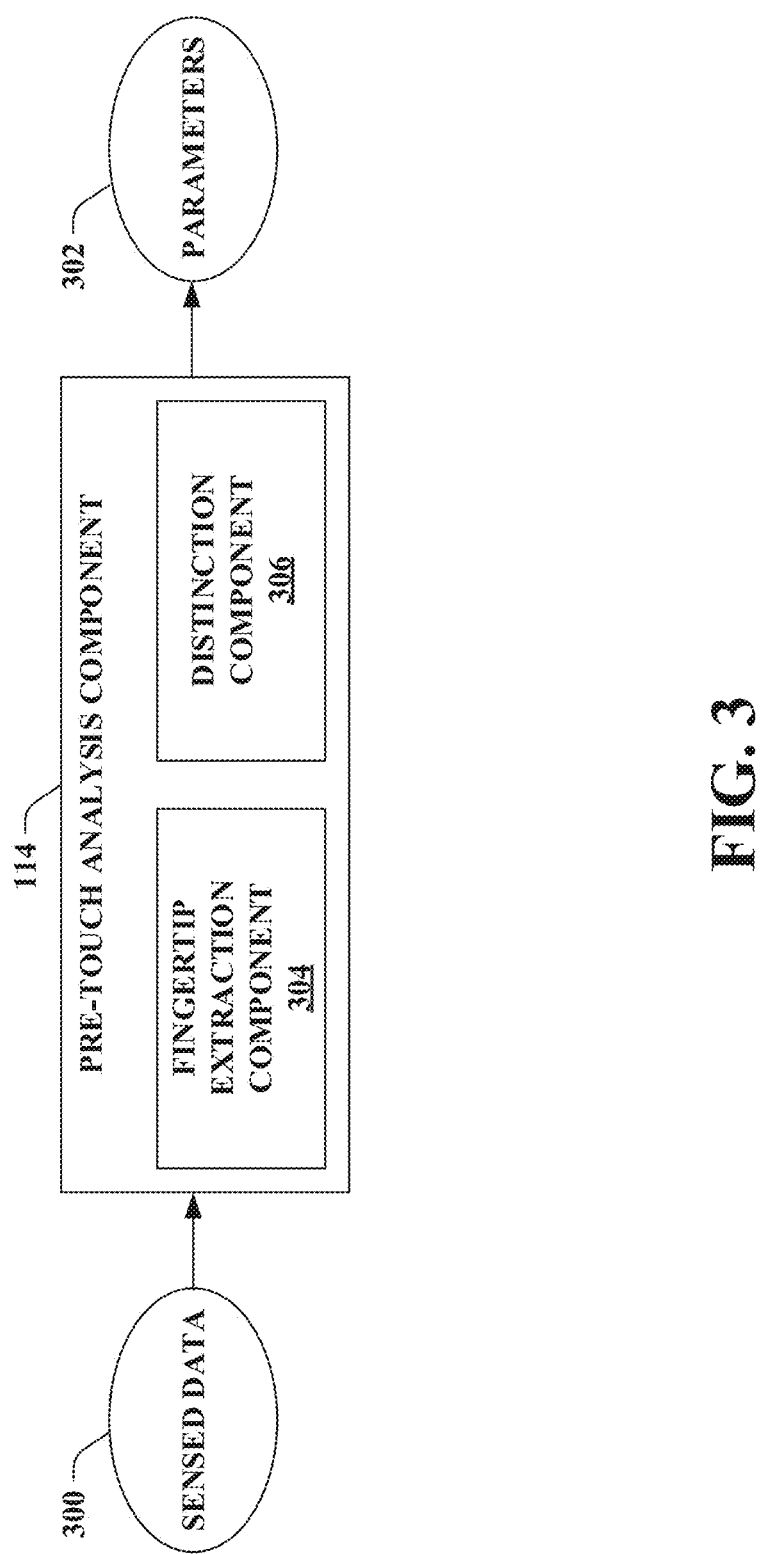
FIG. 3 illustrates a functional block diagram of a pre-touch analysis component in accordance with various embodiments described herein.

Referring now to FIG. 3, illustrated is the pre-touch analysis component 114 in accordance with various embodiments described herein. The pre-touch analysis component 114 can receive sensed data 300. The sensed data 300 can be received from the touchscreen 106. Additionally or alternatively, the sensed data 300 can be received from the sensor 202 (or plurality of sensors). The pre-touch analysis component 114 can detect the pre-touch interaction of the user 102 with the mobile computing device 104 based on the sensed data 300. Moreover, the pre-touch analysis component 114 can identify one or more parameters 302 of the pre-touch interaction of the user 102 with the mobile computing device 104.

An example where the touchscreen 106 (e.g., a self-capacitance touchscreen) of the mobile computing device 104 provides the sensed data 300 to the pre-touch analysis component 114 is now described in greater detail; however, the claimed subject matter is not limited to this example. The sensed data 300 can be a raw sensor image (e.g., a matrix of sensor values). Accordingly, the raw sensor image can be inputted to the pre-touch analysis component 114 (e.g., to detect the pre-touch interaction, to identify the parameters 302).

The pre-touch analysis component 114 can include a fingertip extraction component 304 configured to identify a fingertip in the sensed data 300 (e.g., the raw sensor image obtained by the touchscreen 106). The fingertip extraction component 304 can perform image processing on the raw sensor image to extract the fingertip.

An exemplary illustration of the image processing that can be performed by the fingertip extraction component 304 is now described. It is to be appreciated, however, that the claimed subject matter is not limited to the following illustration, as it is contemplated that other techniques for identifying a fingertip in the sensed data 300 are intended to fall within the scope of the hereto appended claims. Pursuant to the exemplary illustration, the fingertip extraction component 304 can interpolate the raw sensor image. Next, the fingertip extraction component 304 can apply a first fixed threshold to the interpolated image to remove background noise due to the capacitance sensor(s). Thereafter, the fingertip extraction component 304 can increase contrast and apply a second threshold to isolate a fingertip region. The fingertip extraction component 304 can then identify the local maxima. If multiple local maxima are within a predetermined distance (e.g., 1.5 mm), the local maxima can be combined into a single local maximum. Moreover, the fingertip extraction component 304 can apply a circular mask (e.g., with a 5 mm radius) around each local maximum; if the circular masks meet, the fingertip extraction component 304 can select a highest local maximum as the fingertip. Further, if a local maximum falls at a screen edge, such local maximum can be considered as part of the grip as opposed to being treated as a location of a fingertip.

The pre-touch analysis component 114 can further include a distinction component 306 configured to distinguish between a thumb of the user 102 and a finger of the user 102 other than a thumb. An exemplary technique that can be employed by the distinction component 306 is set forth below for illustration purposes; however, it is contemplated that other techniques can be utilized by the distinction component 306 to distinguish between a thumb and a finger other than a thumb. An orientation of the fingertip detected by the fingertip extraction component 304 can be used to identify whether the fingertip is of a thumb or finger. To determine tilt of the fingertip, the distinction component 306 can fit rotated bounding boxes to fingertip blobs; an aspect ratio can indicate whether the fingertip is upright or oblique. A yaw angle can be estimated by the distinction component 306 by finding an angle with a minimum brightness change along the fingertip blob. The distinction component 306 can further combine these metrics to determine if the blob is likely a thumb (e.g., of a hand holding the mobile computing device 104) or a finger from the other hand (e.g., a hand other than the hand holding the mobile computing device 104). If the distinction component 306 identifies a fingertip as being oblique and detects that the finger approached from a same side that the user 102 is gripping the mobile computing device 104, then the distinction component 306 can determine that the finger is a thumb. Otherwise, the distinction component 306 can identify that the finger is a finger other than the thumb.

Reference is again generally made to FIGS. 1-2. As described herein, the mobile computing device 104 can support anticipatory reactions to pre-touch interactions. The anticipatory techniques can proactively adapt the graphical user interface generated by the interface management component 112 to a detected grip of the user 102 on the mobile computing device 104 and detected approach of one or more fingers of the user 102 towards the touchscreen 106. As one or more fingers of the user 102 enter proximity of the touchscreen 106, the interface management component 112 can use the grip, the number fingers, the approach trajectory, etc. to modify the graphical user interface displayed on the touchscreen 106 or otherwise adapt graphical feedback displayed on the touchscreen 106 to suit the shifting context of the pre-touch interaction.

Prior to the touch (e.g., detected by the touch analysis component 116), the interface management component 112 can modify the graphical user interface displayed on the touchscreen 106 based on the parameter(s) of the pre-touch interaction of the user 102 with the mobile computing device 104 as identified by the pre-touch analysis component 114. The graphical user interface as modified by the interface management component 112 can include a control that causes execution of the computing operation, where the control component 118 executes the computing operation responsive to the touch of the control detected by the touch analysis component 116.

According to an example, the interface management component 112 can modify the graphical user interface displayed on the touchscreen 106 by fading a set of controls into the graphical user interface displayed on the touchscreen 106. The set of controls can be faded into the graphical user interface by the interface management component 112 responsive to the parameter(s) of the pre-touch interaction specifying that one or more fingers are approaching the touchscreen 106 prior to the touch. The set of controls faded into the graphical user interface by the interface management component 112 can include the control that causes the execution of the computing operation. Moreover, the interface management component 112 can select the set of controls to be faded into the graphical user interface based on the parameter(s) of the pre-touch interaction. Further, responsive to the parameter(s) of the pre-touch interaction specifying that the one or more fingers are moving out of range of the touchscreen 106, the interface management component 112 can fade the set of controls out of the graphical user interface displayed on the touchscreen 106. Furthermore, various sets or sub-sets of the controls may be faded in or faded out at different rates, or along different animation paths, and include different scaling factors (expansion/contraction) simultaneous with fading. These sets or sub-sets and appearance/disappearance functions may depend on a current task and application, as well as grip, approach trajectory, number of fingers, etc.

For example, a first set of controls can be selected by the interface management component 112 responsive to the parameter(s) of the pre-touch interaction specifying that the mobile computing device 104 is gripped in a left hand of the user 102. Further, a second set of controls can be selected by the interface management component 112 responsive to the parameter(s) of the pre-touch interaction specifying that the mobile computing device 104 is gripped in a right hand of the user 102. A third set of controls can be selected by the interface management component 112 responsive to the parameter(s) of the pre-touch interaction specifying that the mobile computing device 104 is gripped in both the left hand and right hand of the user 102. Moreover, a fourth set of controls can be selected by the interface management component 112 responsive to the parameter(s) of the pre-touch interaction specifying the mobile computing device 104 is neither gripped in the left hand nor gripped in the right hand of the user 102.

Pursuant to another example, the interface management component 112 can select the set of controls to be faded into the graphical user interface based on whether a finger approaching the touchscreen 106 is or is not a thumb as specified by the parameter(s) of the pre-touch interaction. Following this example, a first set of controls can be selected by the interface management component 112 responsive to the parameter(s) of the pre-touch interaction specifying that a thumb of the user 102 is approaching the touchscreen 106. Moreover, a second set of controls can be selected by the interface management component 112 responsive to the parameter(s) of the pre-touch interaction specifying that a finger other than a thumb of the user 102 is approaching the touchscreen 106.

Referring to FIGS. 4-10, illustrated is an exemplary graphical user interface 400 of a video player that can be displayed on the touchscreen 106 of the mobile computing device 104. FIGS. 4-10 depict the graphical user interface 400 being modified prior to a touch based on parameter(s) of the pre-touch interaction of the user with the mobile computing device 104. As shown, a set of controls can be faded into the graphical user interface 400 when finger(s) approach the touchscreen 106, where the set of controls depend on the parameter(s) of the pre-touch interaction (e.g., FIGS. 4-10 show modifications made to the graphical user interface 400 resulting from differing pre-touch interactions of the user).

Although not shown in FIGS. 4-10, it is to be appreciated that the graphical user interface 400 of the video player displayed on the touchscreen 106 includes video content, with the set of controls shown in these figures overlaying such video content (e.g., the controls in the set can be utilized to control playback of the video). According to an example, when the user is not interacting with the mobile computing device 104 (e.g., no finger of the user is detected to be hovering within proximity of the touchscreen 106), the graphical user interface 400 can include the video content without the set of controls (e.g., a default state for the graphical user interface 400). Moreover, the manner, location, and time at which the graphical user interface 400 is modified to present interactive elements can be based on the parameter(s) of the pre-touch interaction. For instance, when a finger approaches the touchscreen 106 (e.g., within proximity of the touchscreen 106 as detected by the pre-touch analysis component 114), the graphical user interface 400 can be modified (e.g., by the interface management component 112) to include the set of controls (e.g., prior to the finger touching the touchscreen 106) corresponding to a particular context of the user (e.g., to allow for the video content to be consumed while the mobile computing device 104 is held in a variety of grips). The interface management component 112 can modify the graphical user interface 400 based on grip parameter(s) and/or hover parameter(s). Moreover, multiple variations of the graphical user interface 400 can be utilized depending on context, and animations can be employed to make the graphical user interface 400 responsive on approach, yet unobtrusive on fade-out.

Some conventional video players include fixed controls that remain on screen as part of a fixed graphical user interface. However, the fixed controls can consume screen real estate, occlude content, and typically are unable to adapt to changing context (e.g., whether one-handed or two-handed interaction is being employed). In contrast, the graphical user interface 400 can be modified based on the parameter(s) of the pre-touch interaction (e.g., to adapt to the changing context of the user); accordingly, when the user is not interacting with the mobile computing device 104, screen real estate consumed by the set of controls can be reduced, occlusion of content can be reduced, etc. due to the modifications of the graphical user interface 400 described herein (e.g., when no fingers of the user are detected to be within proximity of the touchscreen 106).

When a user interacts with the mobile computing device 104 (e.g., the user moves one or more fingers within proximity of the touchscreen 106), the pre-touch analysis component 114 can detect the one or more fingers approaching the touchscreen 106. The interface management component 112 can respond in a speculative manner so that the graphical user interface 400 can begin to present the set of controls. More particularly, the graphical user interface 400 can be modified such that the set of controls is faded into the graphical user interface 400 responsive to sensing the approach of the finger(s). A fade-in animation can be utilized by the interface management component 112 to fade in the set of controls over a fixed period of time (e.g., 200 ms fade-in animation), for example.

Moreover, when the finger(s) of the user move out of range of the touchscreen 106, the interface management component 112 can fade out the set of controls for the video player from the graphical user interface 400, again leaving the focus on the content of the video. According to an example, a fade-out animation can be employed by the interface management component 112 to fade out the set of controls over a fixed period of time. For instance, the fade-out animation can be slower than the fade-in animation (e.g., a 1.2 second animation can be used to fade out the set of controls from the graphical user interface 400). These fade-in/fade-out animations can interrupt an ongoing fading animation (e.g., if spuriously triggered), or if the number of fingers or sensed grip changes in the midst of a user action. Moreover, it is contemplated that the fade-in/fade-out animations can be accompanied with audio and/or haptic feedback, for example.

While the above examples describe fixed time animations being used to fade in and fade out the set of controls, it is to be appreciated that the claimed subject matter is not so limited. For instance, it is to be appreciated that the fading in and/or the fading out can be based directly on sensed finger proximity to the touchscreen 106, however, the claimed subject matter is not so limited.

Figure 4:
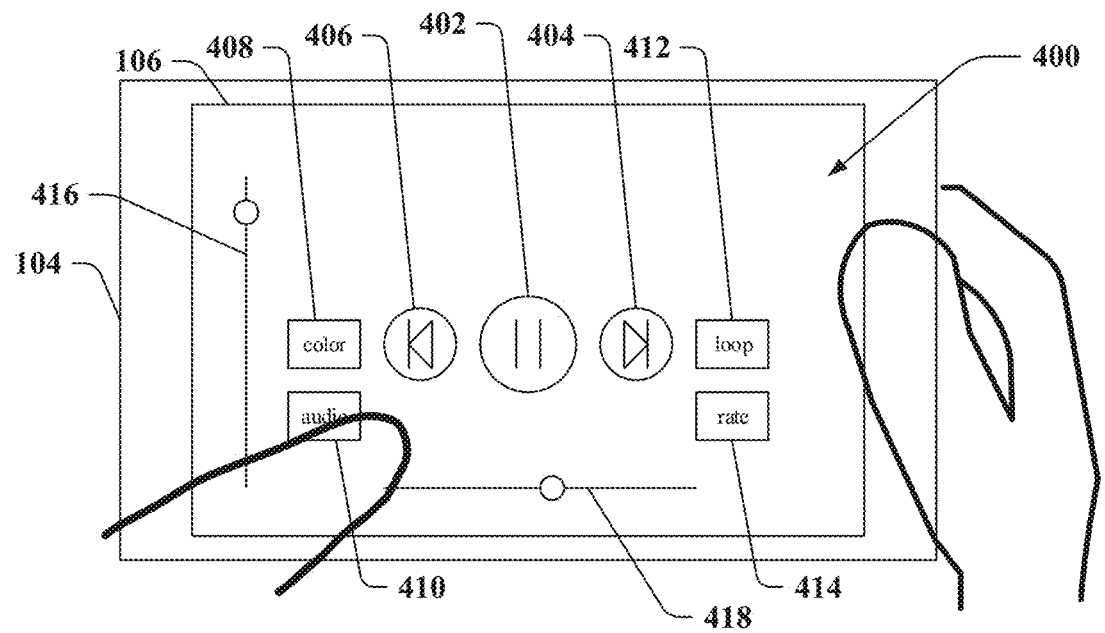
FIGS. 4-10 illustrate an exemplary graphical user interface of a video player that can be displayed on a touchscreen of the mobile computing device.

Turning to FIG. 4, illustrated is a scenario where the mobile computing device 104 is held (e.g., gripped) in a right hand of the user and an index finger of a left hand of the user is approaching the touchscreen 106. As depicted in FIG. 4, the graphical user interface 400 can include a set of controls that includes a pause/play control 402, a fast-forward control 404, a rewind control 406, a color control 408, an audio control 410, a loop control 412, a rate control 414, a volume control 416, and a timeline control 418. Thus, when the user grips the mobile computing device 104 in the right hand and approaches the touchscreen 106 with the index finger of the left hand, the interface management component 112 can fade in the set of controls shown in FIG. 4. According to an example, the fade-in animation utilized by the interface management component 112 can fade in core playback controls (e.g., the pause/play control 402, the fast-forward control 404, and the rewind control 406), and then auxiliary controls that surround the core playback controls can be faded in (e.g., the auxiliary controls can include the color control 408, the audio control 410, the loop control 412, the rate control 414, the volume control 416, and the timeline control 418). Pursuant to another example, the fade-in animation can concurrently fade in the controls shown in FIG. 4. The controls included in the graphical user interface 400 shown in FIG. 4 can be reached by the index finger hovering above the touchscreen 106.

Figure 5:
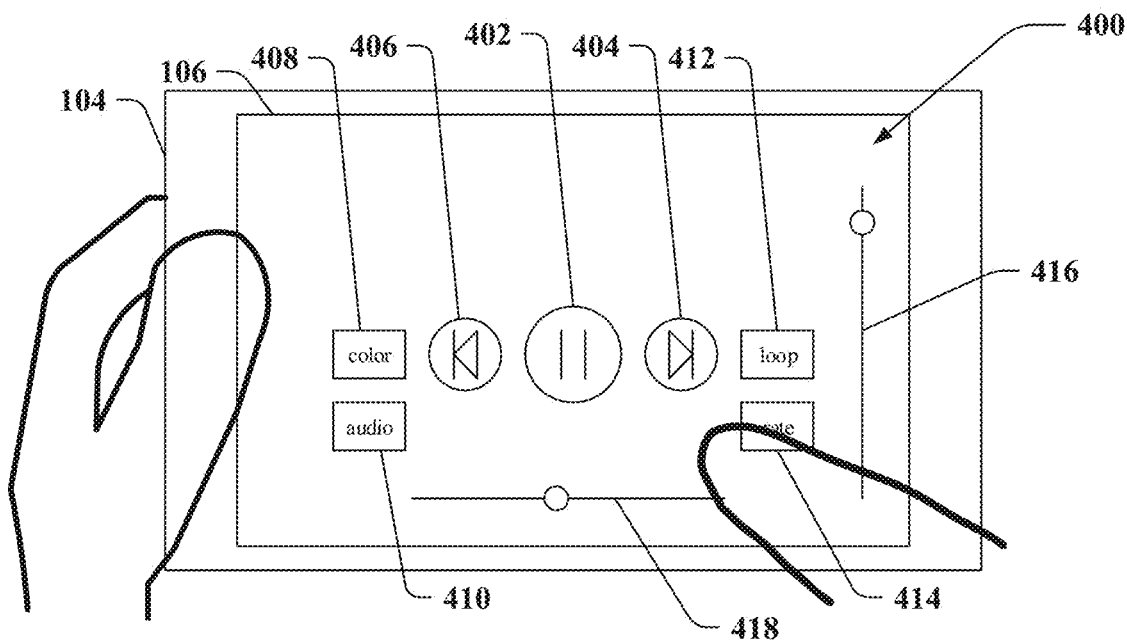

With reference to FIG. 5, illustrated is a scenario where the mobile computing device 104 is held (e.g., gripped) in the left hand of the user and an index finger of the right hand of the user is approaching the touchscreen 106. The graphical user interface 400 shown in FIG. 5 includes the same set of control as compared to graphical user interface 400 of FIG. 4. However, the volume control 416 is positioned at a different location in the graphical user interface 400 in FIG. 5 as compared to FIG. 4. More particularly, a vertical slider for the volume control 416 can be positioned on a side from which the index finger approaches. Thus, in FIG. 4, the vertical slider for the volume control 416 can be positioned on a left side of the set of controls in the graphical user interface 400 due to the left index finger approaching the touchscreen 106, whereas the vertical slider for the volume control 416 can be positioned on a right side of the set of controls in the graphical user interface 400 illustrated in FIG. 5 due to the right index finger approaching the touchscreen 106.

Figure 6:
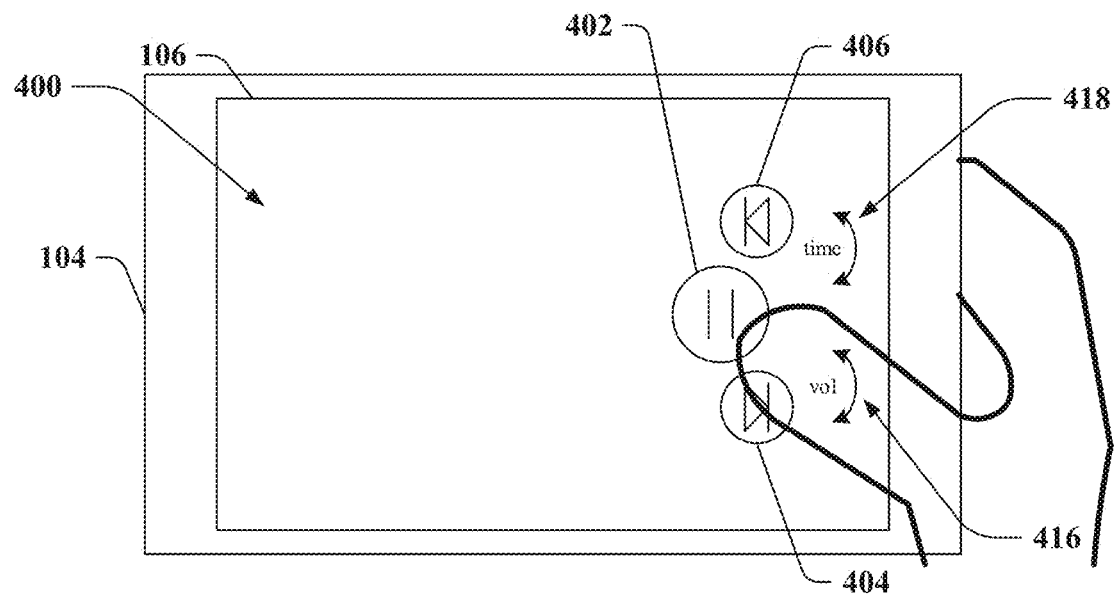

The set of controls selected for inclusion in the graphical user interface 400 can be a context-appropriate variation, which suits a current grip, when the pre-touch analysis component 114 senses the one or more fingers approaching the touchscreen 106. Thus, when the user grips the mobile computing device 104 in a single hand and reaches over to the touchscreen 106 with a thumb of the hand gripping the mobile computing device 104, the interface management component 112 can fade in a set of controls selected for one-handed use into the graphical user interface 400. FIG. 6 depicts a scenario where the mobile computing device 104 is gripped in the right hand of the user and the right thumb approaches the touchscreen 106. Moreover, FIG. 7 shows a scenario where the mobile computing device 104 is gripped in a left hand of the user and the left thumb approaches the touchscreen 106.

Figure 7:
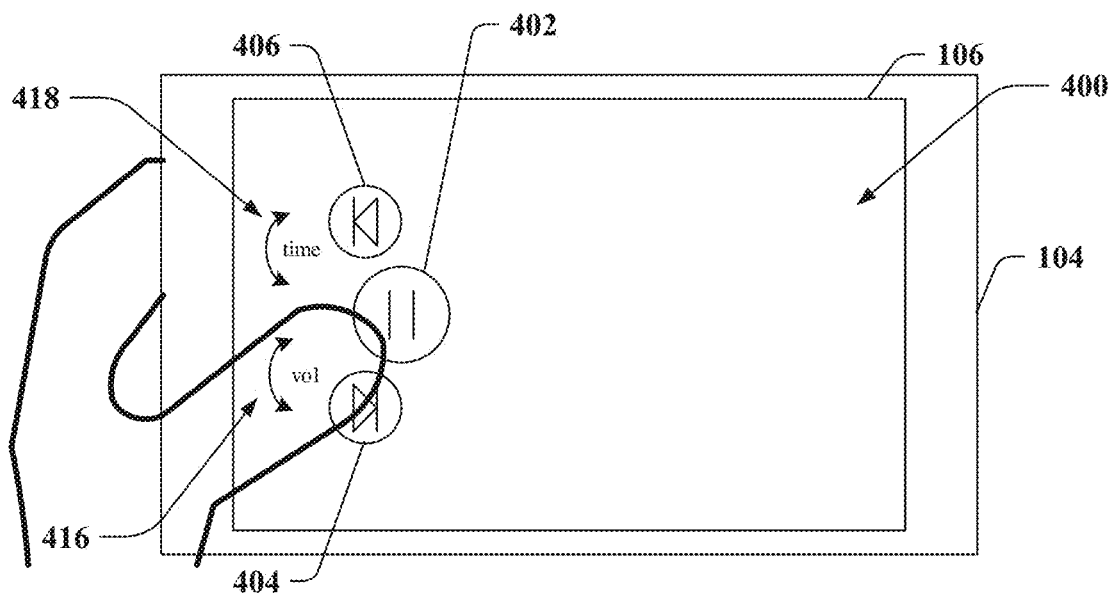

As shown in FIG. 6-7, the set of controls included in the graphical user interface 400 for one-handed interaction can include the pause/play control 402, the fast-forward control 404, and the rewind control 406. These controls can be positioned closer to an edge of the touchscreen 106 with a fan-shaped layout that supports natural movement of the thumb, since it may be difficult for the user to reach a center of the touchscreen 106 under such scenarios. The set of controls included in the graphical user interface 400 for the one-handed interaction shown in FIGS. 6-7 can also include the volume control 416 and the timeline control 418. Accordingly, a reduced set of controls can be included in the graphical user interface 400 for one-handed interaction (as shown in FIGS. 6-7) as compared to two-handed interaction (as shown in FIGS. 4-5) (e.g., since one-handed interaction can be less dexterous and more suited to casual activity).

It is contemplated that the controls can be inserted at fixed locations as part of the graphical user interface 400 shown in FIGS. 6-7. The fixed locations can be utilized due to difficulty associated with predicting a landing position of a thumb from an early portion of a movement trajectory. Moreover, the fixed locations can be predictable to the user, to enhance usability of the graphical user interface 400 for one-handed interaction (e.g., the user can aim for a particular location on the touchscreen 106 out of habit without fully attending to the graphical feedback supplied by the graphical user interface 400). However, the claimed subject matter is not limited to the controls being inserted at fixed locations; instead, the controls can be inserted based on the predicted landing position of the thumb, for example.

According to another example, the set of controls for the one-handed scenarios can be animated onto the touchscreen 106 following a path that mimics the finger approach. This animation can reinforce a connection between the one-handed version of the controls and the coming and going of the thumb from above the touchscreen 106.

Figure 8:
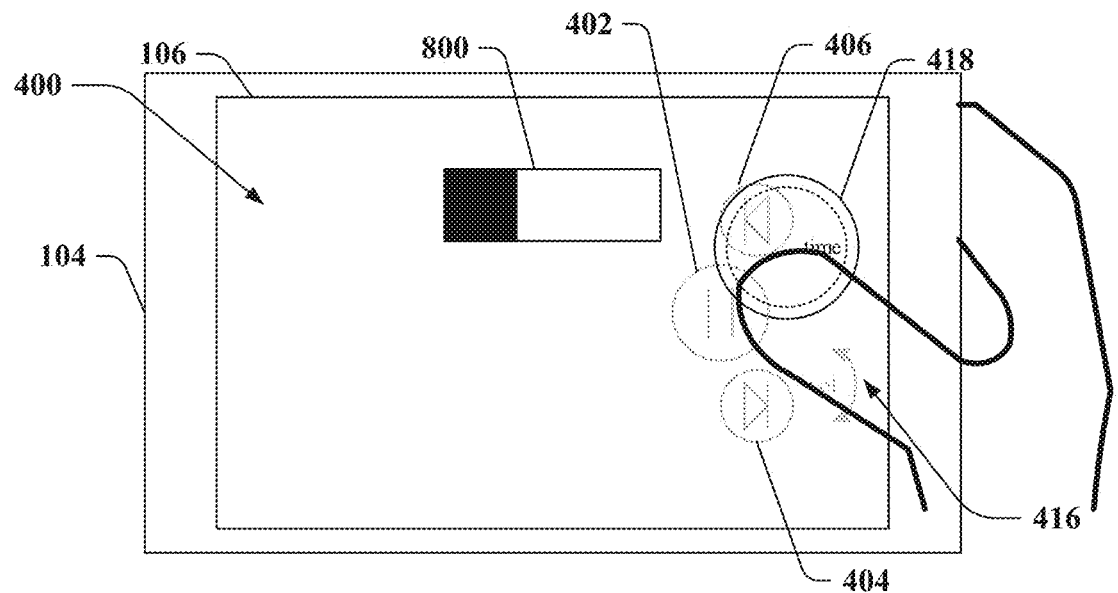

Moreover, the volume control 416 and the timeline control 418 of FIGS. 6-7 can morph into dials when such controls fade in for one-handed interaction. Similar to FIG. 6, FIG. 8 depicts a scenario where the mobile computing device 104 is gripped in the right hand of the user and the right thumb approaches the touchscreen 106. In FIG. 8, the timeline control 418 can change to a dialing control for the right thumb of the user (e.g., when the right thumb touches the timeline control 418 or moves within a predetermined altitude above the timeline control 418). The dialing control can allow the user to traverse through a timeline of a video (a position in the timeline can be represented by a timeline graph 800). It is to be appreciated that the volume control 416 can similarly change to a dialing control.

Figure 9:
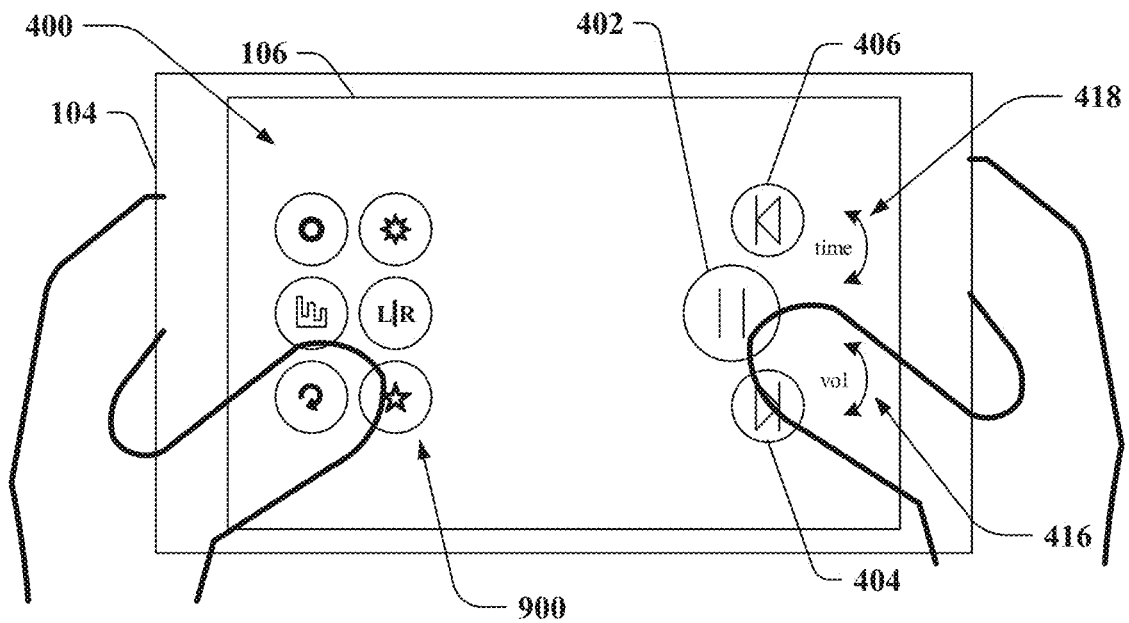

FIG. 9 depicts a scenario where the mobile computing device 104 is initially gripped in the right hand of the user, with the right thumb approaching the touchscreen 106 (similar to FIG. 6); thereafter, the left thumb approaches the touchscreen 106 while the right thumb remains within proximity of the touchscreen 106. When the user reaches onto the touchscreen 106 with a second thumb (e.g., the left thumb as shown in FIG. 9), the graphical user interface 400 can be modified to supplement the one-handed controls with an additional set of controls 900 for the left hand. The set of additional controls 900 can slide in for the second thumb, while the first thumb can invoke the one-handed version of the graphical user interface 400 described above with respect to FIGS. 6-7.

Figure 10:
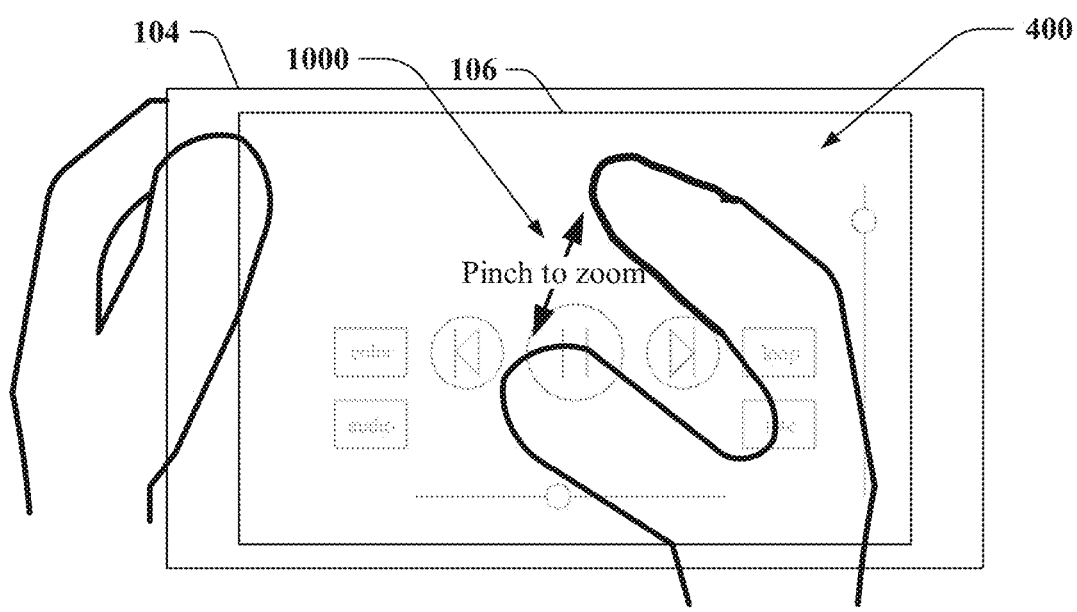

FIG. 10 depicts a scenario where the mobile computing device 104 is gripped in the left hand of the user and the right index finger and right thumb approach the touchscreen 106. Accordingly, this scenario can be similar to the scenario depicted in FIG. 5. Responsive to detecting the right index finger and the right thumb hovering above the touchscreen 106 in a pinch-to-zoom posture, the set of controls in the graphical user interface 400 as depicted in FIG. 5 can be faded out, and instead a gestural guide 1000 can be presented in the graphical user interface 400.

Reference is again generally made to FIGS. 4-10. It is contemplated that the approach direction can be utilized (e.g., by the interface management component 112) in various manners. For example, as part of the one-handed variant shown in FIGS. 6-7, the controls can slide into the graphical user interface 400 displayed on the touchscreen 106 in a path that mimics the approach of the thumb. According to another example, the approach trajectory can refine the presentation of the vertical volume slider (e.g., the volume control 416) in relation to the remainder of the controls for the bimanual grip with the approaching index finger scenarios (as depicted in FIGS. 4-5). Following this example, if the index finger approaches from the right, the volume control 416 can appear to the right of the remaining controls (as shown in FIG. 5), whereas if the index finger approaches from the left, indicative of left-handed use, the volume control 416 can flip to the opposite side (as shown in FIG. 4) to enable easier reach for the user.

Again, reference is made to FIGS. 1-2. According to another example where the mobile computing device 104 supports anticipatory reactions to pre-touch interactions, the interface management component 112 can selectively reveal user interface affordances as part of a graphical user interface displayed on the touchscreen 106. The graphical user interface (e.g., of a web page) can employ various visual conventions to signify user interface affordances for actionable content. For instance, the user interface affordances can include links that are underlined, hash tags that are highlighted, playback controls that are overlaid on interactive media (e.g., videos, podcasts), and so forth. Such affordances may furthermore be only partially revealed, depending on proximity to the finger(s) reaching for the touchscreen 106, and in a manner that feathers off based on the shape of the sensed hand geometry.

The interface management component 112 can selectively reveal the user interface affordances responsive to parameter(s) of the pre-touch interaction specifying that one or more fingers are approaching the touchscreen 106 prior to the touch. The user interface affordances that are selectively revealed can correspond to posture of the one or more fingers approaching the touchscreen 106. Moreover, the user interface affordances that are selectively revealed by the interface management component 112 can include a user interface affordance that causes execution of a computing operation. Thus, a computing operation can be executed by the control component 118 responsive to detection of a touch of the user interface affordance that causes the execution of such computing operation.

Figure 11:
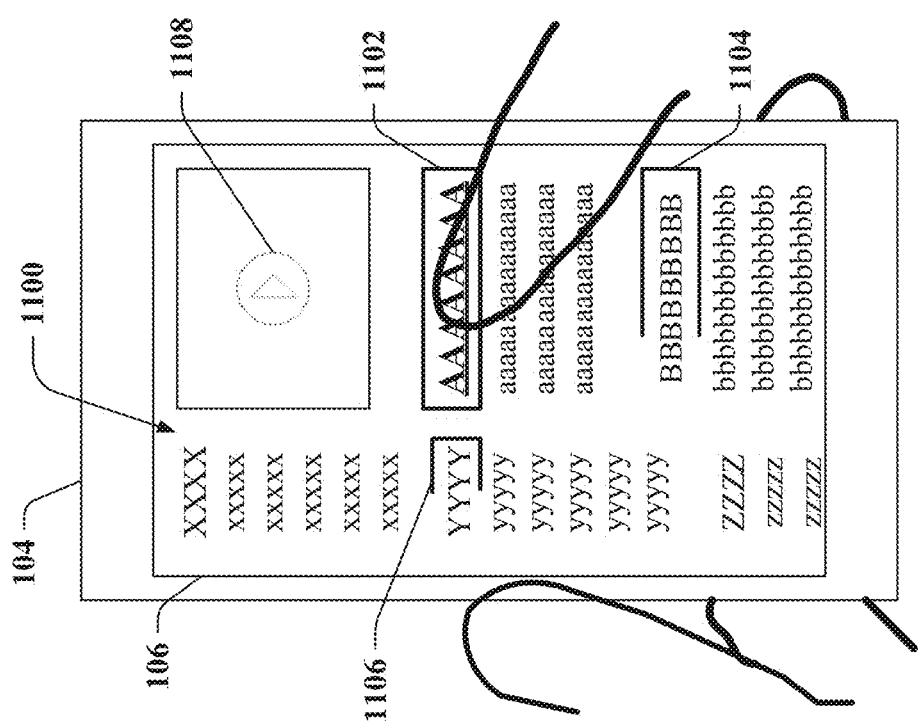
FIG. 11 illustrates an exemplary graphical user interface that selectively reveals user interface affordances.

Turning to FIG. 11, illustrated is an exemplary graphical user interface 1100 that can selectively reveal user interface affordances. The graphical user interface 1100 can be a graphical user interface of a web browser. A web page can employ various visual conventions to provide user interface affordances for actionable content; for instance, as noted above, links can be underlined, hash tags can be highlighted, playback controls can be overlaid on interactive media, and so forth. Yet, showing such affordances can add clutter to content included in the web page itself, whereas web pages that omit the affordances in deference to a cleaner design can leave a user uncertain as to which content is interactive.

The graphical user interface 1100 can selectively reveal the user interface affordances based on location(s) on the touchscreen 106 above which finger(s) of the user are hovering (e.g., within proximity of the touchscreen 106). Accordingly, when finger(s) of the user approach the touchscreen 106, hyperlinks, playback controls, and/or other types of user interface affordances can be revealed (e.g., by the interface management component 112). Further, the user interface affordances can be revealed in a manner that feathers off with the contours of the finger, thumb, or hand of the user above the touchscreen 106.

As shown in FIG. 11, the mobile computing device 104 can be held in the left hand of the user and the right index finger can approach the touchscreen 106. A hyperlink 1102 can be revealed based on the position of the right index finger. Moreover, more distant user interface affordances can be hinted at in a subtler manner in the graphical user interface 1100, such as a hyperlink 1104, a hyperlink 1106, and a playback control 1108.

When a finger of the user is not within proximity of the touchscreen, the user interface affordances can be hidden, thereby allowing the user to read the content included in the graphical user interface 1100 without the clutter of the user interface affordances (e.g., while the user is holding the mobile computing device 104). Moreover, when a finger is within proximity of the touchscreen 106, such as the right index finger as depicted in FIG. 11, user interface affordances in portions of the graphical user interface 1100 that are more distant from the position of the finger can be hidden. Again, the user interface affordances can be hidden in these portions of the graphical user interface 1100 to enable the user to read the content without the clutter.

Feathering (e.g., gradual trailing off) of the interactive affordances can allow a user to see various actionable items rather than visiting them one by one. Moreover, the feathering can emphasize that items are nearby, while more distant items are hinted at in a subtle manner. Thus, this can lead to gradual revelation of the user interface affordances in accordance with proximity to the hand, as opposed to having individual elements visually pop in and out of a graphical user interface in a distracting manner. For example, the playback control 1108 for a video can blend in a subtle manner onto the page as opposed to popping out in a discrete object.

The interface management component 112 can implement this effect by alpha-blending an overlay image, which can include various visual affordances, with a thresholded and interpolated raw finger image. The overlay can appear when a finger comes into proximity of the touchscreen 106. The overlay can transition between being transparent and being visible as the hand moves closer to the touchscreen 106. It is also contemplated, for example, that more than one overlay image (e.g., one overlay image per user interface object) may be utilized by the interface management component 112; as such, the interface management component 112 can composite together two or more overlay images into an overlay layer for controlled fading and feathering. Hover parameter(s) of the hover of one or more fingers of the user with respect to the touchscreen 106 can be used to selectively reveal the user interface affordances in a manner that is multi-touch and corresponds to the sensed posture of the fingers of the user.

Figure 12:
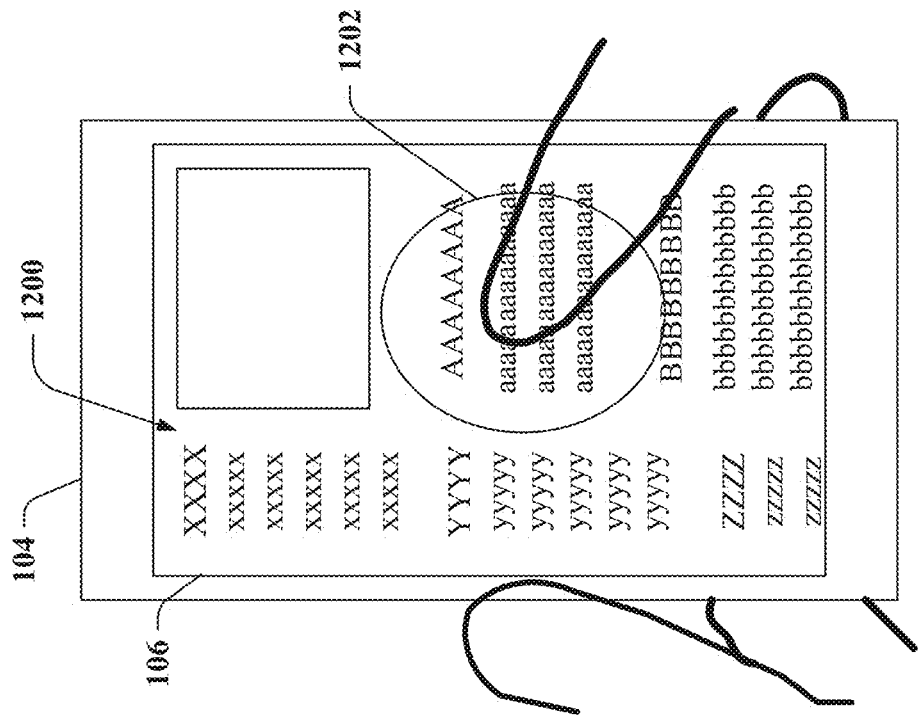
FIG. 12 illustrates an exemplary graphical user interface that includes highlighted portions for collaborative reference.

Now turning to FIG. 12, illustrated is an exemplary graphical user interface 1200 that can include highlighted portions for collaborative reference. Again, the mobile computing device 104 can be held in the left hand of the user, while the right index finger approaches the touchscreen 106 in the example depicted in FIG. 12. Sensed contour(s) of the approaching finger(s) can be utilized to highlight portions of the graphical user interface 1200. As shown, a portion 1202 of the graphical user interface 1200 can be highlighted based on the contour of the approaching right index finger of the user. Accordingly, the graphical user interface 1200 supports highlighting portion(s) thereof in a manner that conforms to the contour(s) of the finger or fingers hovering above the touchscreen 106.

Figure 13:
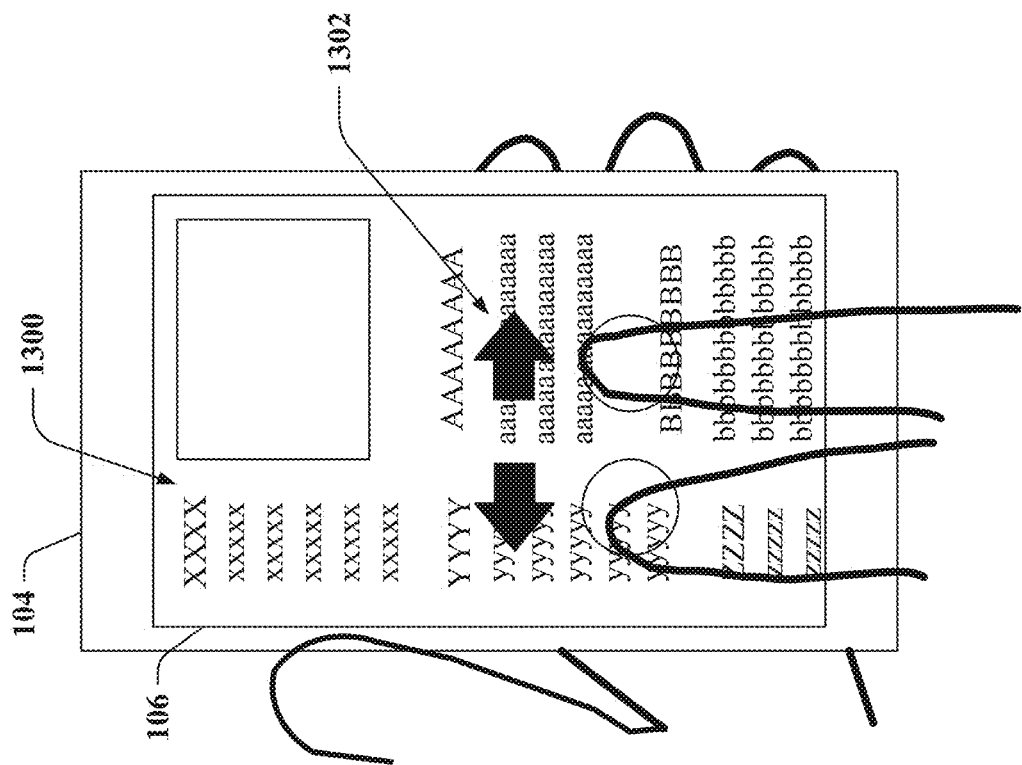
FIG. 13 illustrates an exemplary graphical user interface that includes a multi-finger gesture guide.

With reference to FIG. 13, illustrated is another exemplary graphical user interface 1300. As shown, the graphical user interface 1300 can include a multi-finger gesture guide 1302. A two-finger tabbing gesture to slide back and forth between browsing tabs can be supported by the multi-finger gesture guide 1302. To afford self-revelation of this gesture, the interface management component 112 can fade in a gesture overlay when two fingers are sensed side-by-side in an appropriate posture for a threshold period of time (e.g., 100 ms). Moreover, hyperlinks and other user interface affordances can concurrently be faded out (e.g., the user interface affordances from FIG. 11). The overlay can be in context and can be contingent on the posture of the fingers. Other multi-touch gestures (e.g., pinches, three and four-finger swipes) can additionally be revealed (or suppressed) depending on the geometry of the approaching fingers.

Reference is again generally made to FIGS. 1-2. As described herein, the mobile computing device 104 can support utilizing the parameter(s) of the pre-touch interaction of the user 102 for retroactive interpretations of touch events. The control component 118 can disambiguate the touch detected by the touch analysis component 116 based on the parameter(s) of the pre-touch interaction of the user 102 with the mobile computing device 104. Thus, a computing operation executed by the control component 118 responsive to the touch can be based on the touch as disambiguated. For instance, the touch can be disambiguated by the control component 118 based on an approach trajectory leading to the touch of the user 102 on the touchscreen 106 of the mobile computing device 104. Accordingly, pre-touch can act as a back channel that augments a touch event detected by the touch analysis component 116 by enabling retroactive inspection of the approach trajectory at the time of the touch event to glean more information about the pointing movement. As such, this way of using pre-touch can reside in the background, while supporting a foreground action (e.g., the intentional act of touching). Accordingly, unlike anticipatory techniques described above, retroactive techniques may not produce an effect if the user doesn't complete the movement and make contact with touchscreen 106.

The approach trajectory can provide information that may enhance identification of a user's intent. According to an example, the touch can be disambiguated by the control component 118 in a manner such that a graphical target included in a graphical user interface displayed on the touchscreen 106 intended to be touched by the user 102 can be detected based on the approach trajectory leading to the touch of the user 102 on the touchscreen 106 of the mobile computing device 104.

Figure 14:
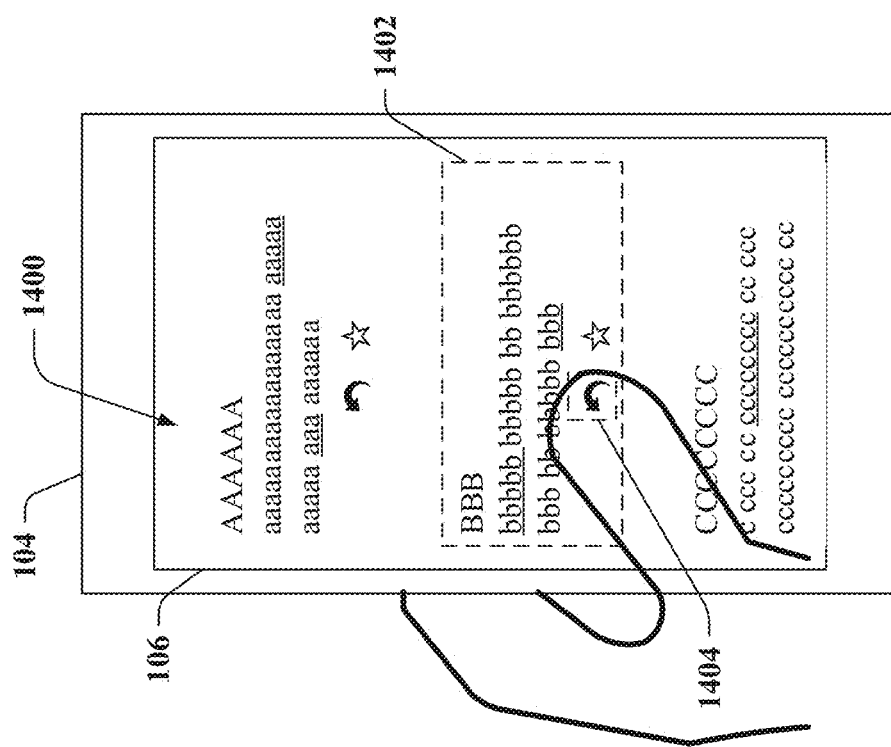
FIG. 14 illustrates another exemplary graphical user interface displayed on the touchscreen of the mobile computing device.

FIG. 14 shows another exemplary graphical user interface 1400 displayed on the touchscreen 106 of the mobile computing device 104. In the scenario depicted in FIG. 14, the mobile computing device 104 is held in the left hand of the user, with a left thumb of the user positioned above both a large graphical target 1402 and a small graphical target 1404 included in the graphical user interface 1400. If the left thumb touches the touchscreen 106 at the depicted position, it may be unclear whether the user intended to touch the large graphical target 1402 or the small graphical target 1404 based solely on the detected touch. For instance, when the user taps on the large graphical target 1402, an imprecise ballistic motion of a finger (e.g., the left thumb) may cause the finger to land on one of the smaller graphical targets, such as the small graphical target 1404, triggering an accidental or unwanted action corresponding to the smaller graphical target. Moreover, when the user attempts to tap on the small graphical target 1404, if the user misses the small graphical target 1404 by a few pixels, then an action associated with the larger graphical target 1402 can be caused rather than an action associated with the small graphical target 1404.

Accordingly, the touch can be disambiguated based on parameter(s) of the pre-touch interaction of the user with the mobile computing device 104; thus, a graphical target included in the graphical user interface 1400 displayed on the touchscreen 106 intended to be touched by the user can be detected. According to an example, an approach trajectory leading to the touch of the user on the touchscreen 106 can be used to detect the graphical target intended to be touched by the user.

To disambiguate the touch (e.g., detected by the touch analysis component 116) in the scenario shown in FIG. 14, the control component 118 can inspect the in-air approach trajectory upon the finger-down event. If the control component 118 observes that the finger motion was ballistic, then the computing operation associated with the large graphical target 1402 can be caused by the control component 118. Moreover, if the motion appears to include fine adjustments, then instead, the control component 118 can dispatch the computing operation associated with the small graphical target 1404, even if the touch is not directly on the small graphical target 1404.

Figure 15:
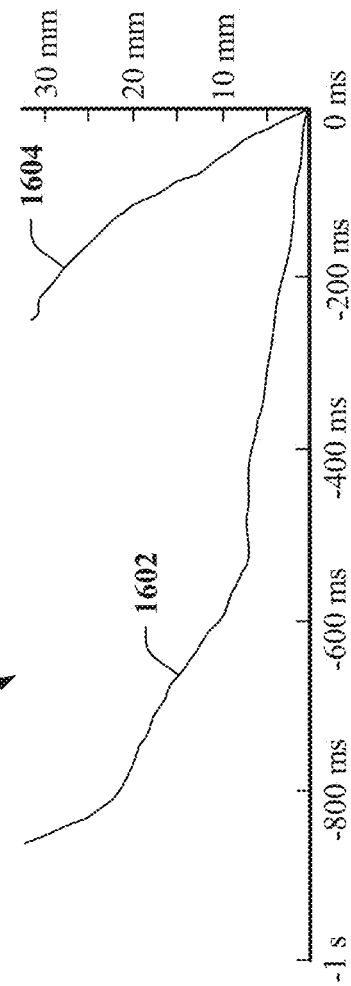
FIG. 15 illustrates an exemplary scenario of a touch on a touchscreen.

FIG. 15 illustrates an example touch on the touchscreen 106. Again, a large graphical target 1502 and a small graphical target 1504 can be included in a graphical user interface displayed on the touchscreen 106. The touch, while not directly on the small graphical target 1504 (and instead on the large graphical target 1502), can be interpreted as being for the small graphical target 1504 if the approach trajectory leading to the touch is determined to include a fine adjustment phase (and if the touch is within a threshold distance from the small graphical target 1504).

Pursuant to an example, the control component 118 can utilize a heuristic to determine whether an approach trajectory leading to the touch includes or lacks a fine adjustment phase. For instance, the approach trajectory of a finger leading to the touch can be identified as including a fine adjustment phase if the finger is at an altitude under 10 mm above the touchscreen 106, within 15 mm of the touch-down location, for the 250 ms before making contact with the touchscreen 106 of the mobile computing device 104. However, it is to be appreciated that differing heuristics are intended to fall within the scope of the hereto appended claims. For example, differing heuristics can be used based on whether the mobile computing device 104 is held in one hand versus two hands, based on an identity of a user employing the mobile computing device 104, and so forth.

Figure 16:
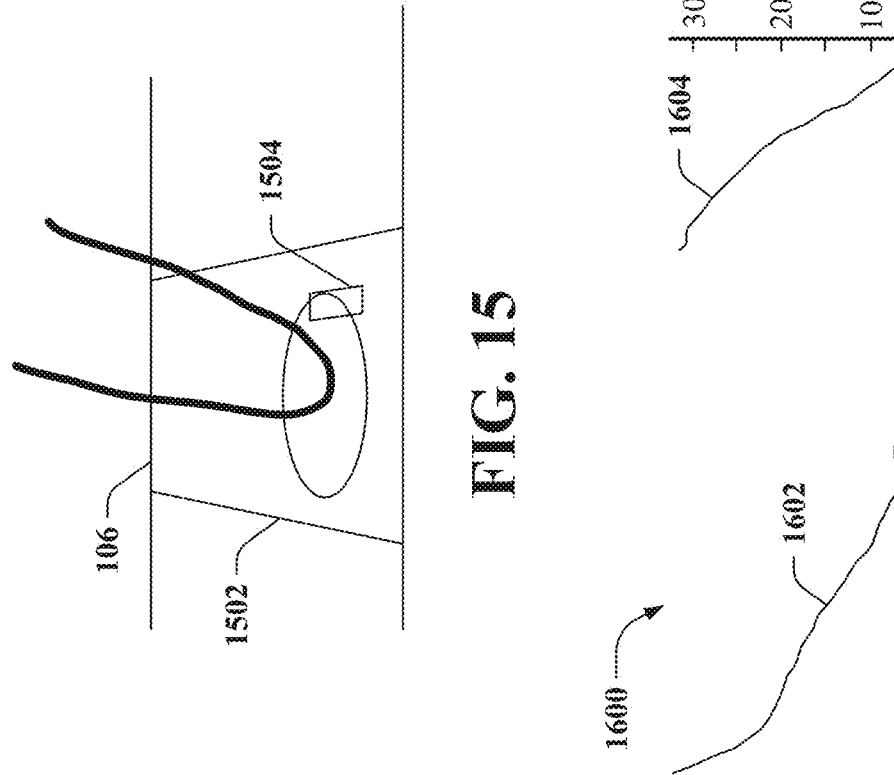
FIG. 16 illustrates an exemplary graph that includes exemplary approach trajectory curves.

Turning to FIG. 16, illustrated is an exemplary graph 1600 that includes exemplary approach trajectory curves. The graph 1600 includes an approach trajectory curve 1602 for a small graphical target and an approach trajectory curve 1604 for a large graphical target. The approach trajectory curves 1602-1604 represent distances above a touchscreen for a single finger at times before touch down for the differing approach trajectories. When tapping on the small graphical target, the user can make fine adjustments prior to tapping down as shown by the curve 1602. Moreover, for the large graphical target, the finger can land on the touchscreen with a ballistic motion as shown by the curve 1604.

Again, reference is made generally to FIGS. 1-2. According to another example of the retroactive use of the pre-touch interaction, a type of gesture of which the touch detected by the touch analysis component 116 is part can be detected based on the approach trajectory leading to the touch of the user 102 on the touchscreen 106 of the mobile computing device 104. For instance, a flick gesture (e.g., for scrolling) versus a select gesture (e.g., for selection of a passage of text) can be detected by the control component 118 when the finger comes into contact with the touchscreen 106. As opposed to using a tap-and-hold to distinguish between these gesture types, the control component 118 can detect the gesture type based on the approach trajectory leading to the touch. For instance, an approach trajectory with a ballistic swiping motion can be interpreted by the control component 118 as a flick gesture, whereas an approach trajectory with a fine adjustment phase (e.g., associated with targeting intended word boundaries of the selection) can be interpreted by the control component 118 as a select gesture.

According to yet another example, hybrid touch and hover interactions can be supported by the mobile computing device 104. While the touch of the user 102 is detected by the touch analysis component 116, a concurrent hover of one or more fingers of the user 102 other than a finger currently touching the touchscreen 106 can be detected by the pre-touch analysis component 114. Moreover, the pre-touch analysis component 114 can identify parameter(s) of the concurrent hover. The touch analysis component 116 can further detect a differing touch of the user on the touchscreen 106 of the mobile computing device 104. Further, a differing computing operation can be executed by the control component 118 responsive to the differing touch, where the differing computing operation can be based on the differing touch and the parameter(s) of the concurrent hover.

Figure 18:
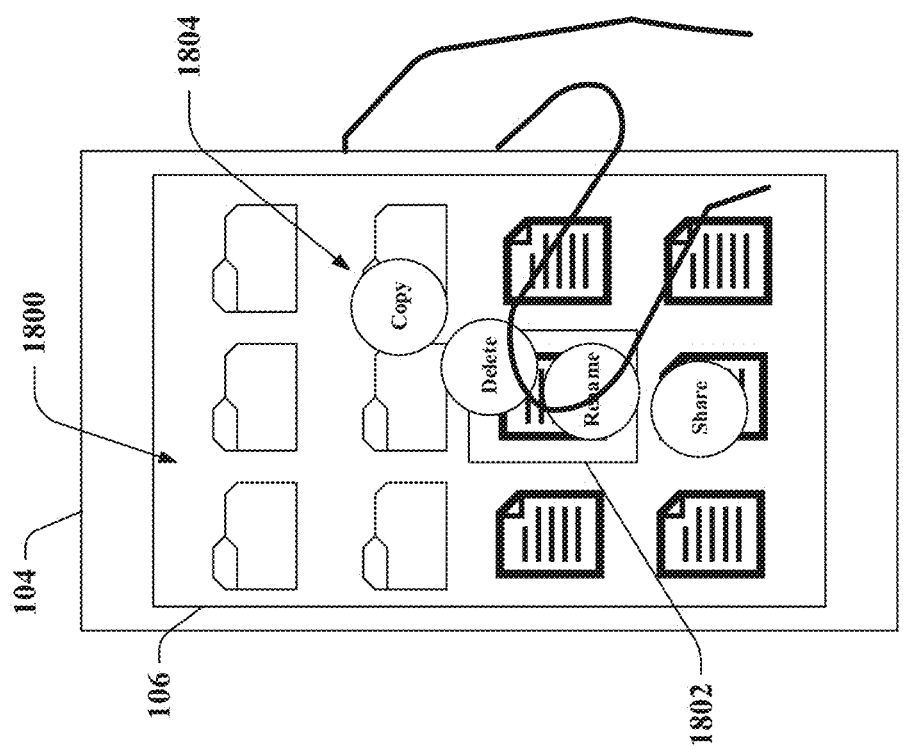
FIGS. 17-18 illustrate graphical user interfaces displayed on the touchscreen of the mobile computing device for exemplary hybrid touch and hover interactions.
Figure 17:
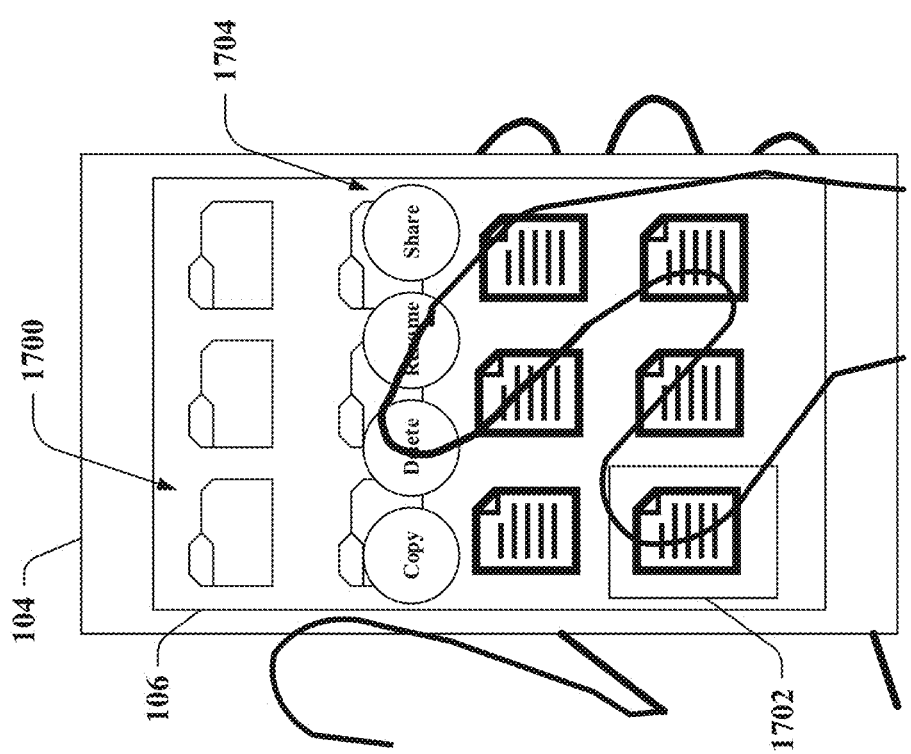

Pre-touch can lend itself to hybrid touch and hover gestures that combine on-screen touch with a simultaneous in-air gesture. FIGS. 17-18 illustrate graphical user interfaces displayed on the touchscreen 106 of the mobile computing device 104 for exemplary hybrid touch and hover interactions. More particularly, FIG. 17 shows a scenario where the mobile computing device 104 is held in the left hand of the user and fingers of the right hand are used to provide the hybrid touch and hover gesture. As part of the hybrid touch and hover gesture, the right thumb can select an icon 1702 corresponding to a document in a graphical user interface 1700 displayed on the touchscreen 106. The right index finger can be moved within proximity of the touchscreen 106 to cause the graphical user interface 1700 to be modified to display a context menu 1704. The context menu 1704 in the illustrated example can include buttons for copying, deleting, renaming, and sharing the document selected responsive to the touch (e.g., the document corresponding to the icon 1702 touched by the right thumb). The computing operations corresponding to the buttons can thereafter be executed responsive to a detected touch by the right index finger (e.g., the document can be copied responsive to the right index finger touching the copy button).

A hybrid touch and hover gesture is a compound task. For instance, the user can make a first selection by touching a first finger to the touchscreen 106 (e.g., select the file associated with the icon 1702 by touching the icon 1702), and then can make a second selection by touching a second finger to the touchscreen 106 while the first finger continues to touch the touchscreen 106 (e.g., move the second finger within proximity of the touchscreen 106 to cause the context menu 1704 to be displayed and select a computing operation to be performed on the file by touching the second finger to a particular button in the context menu 1704).

The hybrid touch and hover gesture can integrate selection of a desired object with activation of a menu, articulated as a single compound task. The user can first select the desired file by holding a thumb on a corresponding icon, while simultaneously bringing a second finger into range. The foregoing can cause the menu 1704 to be displayed. In contrast, many conventional approaches employ a tap and hold gesture to cause a menu to be displayed, which can introduce a delay (e.g., display of the menu with such conventional approaches can be delayed due to the wait time for the tap and hold gesture).

According to an example, the graphical user interface 1700 can be modified to include the context menu 1704 at a position on the touchscreen 106 that corresponds to a detected location of the right index finger (e.g., under the detected location of the right index finger). Thus, the identified location of finger(s) of the user can be used when modifying the graphical user interface 1700 to include the context menu 1704. Moreover, the opacity of the context menu 1704 can be proportional to an altitude of the finger above the touchscreen 106. The user can complete the transaction by touching down on the desired command with the second finger. Alternatively, the user can cancel the action by lifting the second finger.

Thus, the hybrid touch and hover gesture can enable shortcutting the timeout that would otherwise be utilized as part of a tap and hold. Moreover, the hybrid touch and hover gesture can enable a menu to be displayed at a location specified by a location of a second finger of the user hovering above the touchscreen 106. The hybrid touch and hover gesture further enables selection and action (e.g., calling up the menu 1704) to be phrased as part of a single compound task.

While shown and described as the thumb initially selecting the icon 1702 and then picking the command from the context menu 1704 with the index finger, it is to be appreciated that the claimed subject matter is not so limited. For instance, the index finger can first be utilized to select the icon 1702, and then the thumb can be utilized to call up and select from the later displayed menu 1704 (e.g., the roles of the thumb and index finger can be reversed, which can make the interaction more flexible). Moreover, fingers other than the thumb and index finger can be employed.

By employing the hybrid touch and hover gesture, the graphical user interface 1700 can be modified based on the parameter(s) of the concurrent hover (e.g., for the second, approaching finger) while the touch of the first finger continues to be detected on the touchscreen 106. Accordingly, the context menu 1704 can be revealed in the graphical user interface 1700 before the user has to commit to a computing operation to be performed, in a location corresponding to the second, approaching finger, and without the second, approaching finger occluding the screen location.

FIG. 18 shows a scenario where the mobile computing device 104 is held in the right hand of the user and the right thumb is used to make a selection. The menu activation gesture described in connection with FIG. 17 can be used when the mobile computing device 104 is identified as being interacted with by the user using two hands (e.g., held in one hand with fingers of the other hand approaching and/or touching the touchscreen 106). Since pre-touch enables the grip of the user to be detected, a graphical user interface 1800 displayed on the touchscreen 106 for the one-handed operation can differ from the graphical user interface 1700 displayed on the touchscreen 106 for two-handed operation.

As shown in FIG. 18, the user can select an icon 1802 by touching the touchscreen 106 with the right thumb. A tap and hold using the right thumb can cause the context menu 1804 to be displayed in the graphical user interface 1800. The context menu 1804 can be presented with a fan-shaped layout that arcs in a direction appropriate to a side from which the thumb approaches. A second touch of the thumb on the touchscreen 106 can be used to select a computing operation corresponding to one of the buttons of the context menu 1804.

According to another example, it is contemplated that the hybrid touch and hover gesture can be used for gaming. For instance, a game can use the fingers to mimic kicking a soccer ball, where one finger can stay planted while the other finger strikes the ball. A trajectory of the kicked ball can depend on a direction of movement and how high (or low) to the ground the user kicks. The finger can also be lifted above the ball to step on the ball, or to move over the ball in order to back-foot the ball, for instance. The finger movements can also control walking, turning, and other leg movements of an avatar in a virtual environment, for example.

Figure 19:
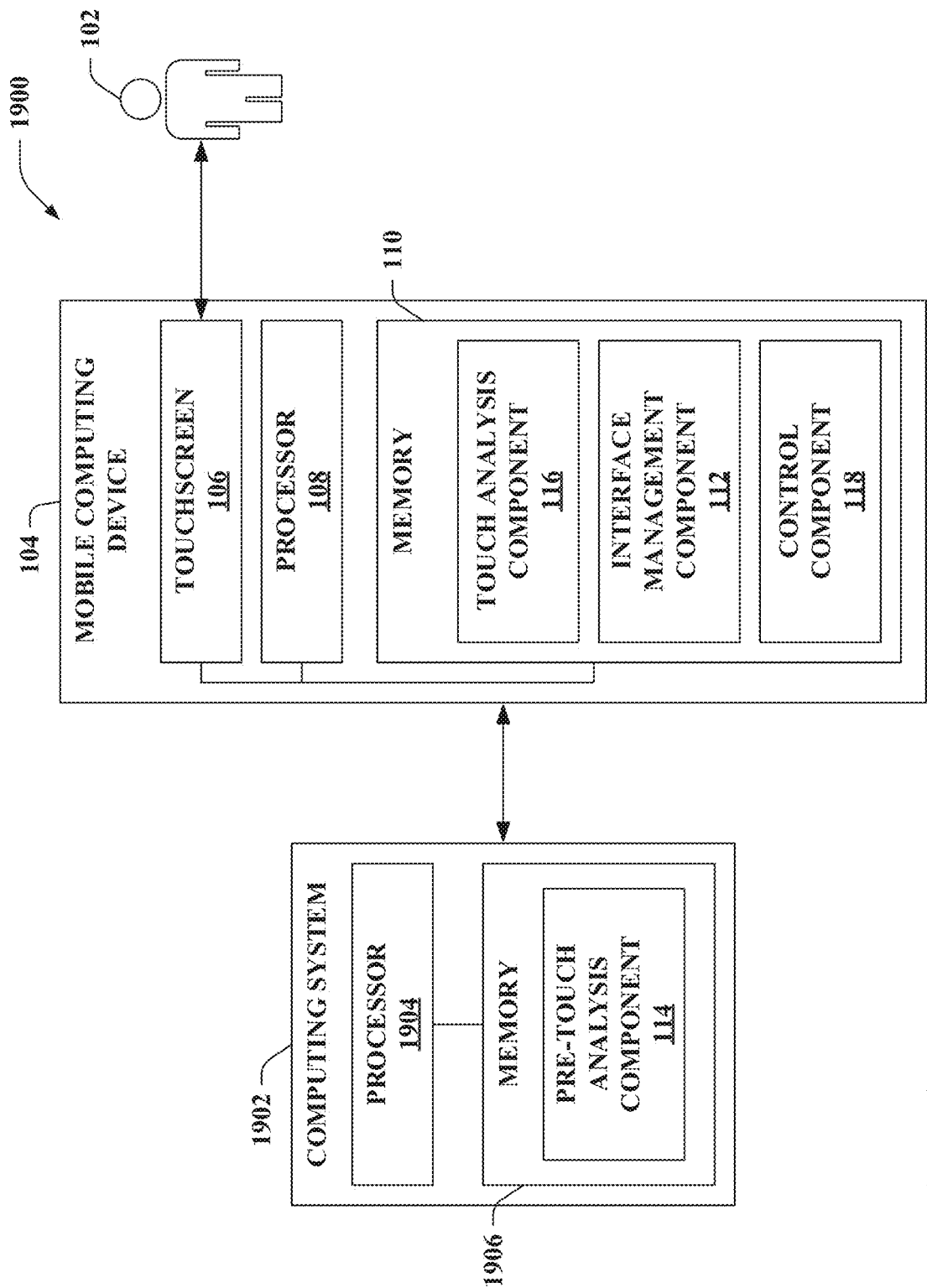
FIG. 19 illustrates a functional block diagram of another exemplary system that senses pre-touch interactions of the user with the mobile computing device to control execution of computing operations responsive to touch

Now turning to FIG. 19, illustrated is another system 1900 that senses pre-touch interactions of the user 102 with the mobile computing device 104 to control execution of computing operations responsive to touch. The system 1900 again includes the mobile computing device 104, which further includes the touchscreen 106, at least one processor 108, and the memory 110. Similar to the examples set forth in FIGS. 1 and 2, the memory 110 can include the touch analysis component 116, the interface management component 112, and the control component 118.

The system 1900 further includes a computing system 1900. The computing system 1900 is separate from, but in communication with, the mobile computing device 104. The computing system 1900 can include at least one processor 1904 and memory 1906. The processor 1904 is configured to execute instructions loaded into the memory 1906. In accordance with the example shown in FIG. 19, the memory 1906 of the computing system 1902 can include the pre-touch analysis component 114. Accordingly, sensor data obtained by the mobile computing device 104 (e.g., obtained by the touchscreen 106 and/or the sensor 202) can be transmitted by the mobile computing device 104 to the computing system 1902. The computing system 1902 can receive such sensor data, and the pre-touch analysis component 114 of the computing system 1902 can detect the pre-touch interaction of the user 102 with the mobile computing device 104. Moreover, the pre-touch analysis component 114 can identify parameter(s) of the pre-touch interaction of the user with the mobile computing device 104. The parameter(s) can be transmitted to the mobile computing device 104 for further use by the interface management component 112 and/or the control component 118 as described herein.

Figure 20:
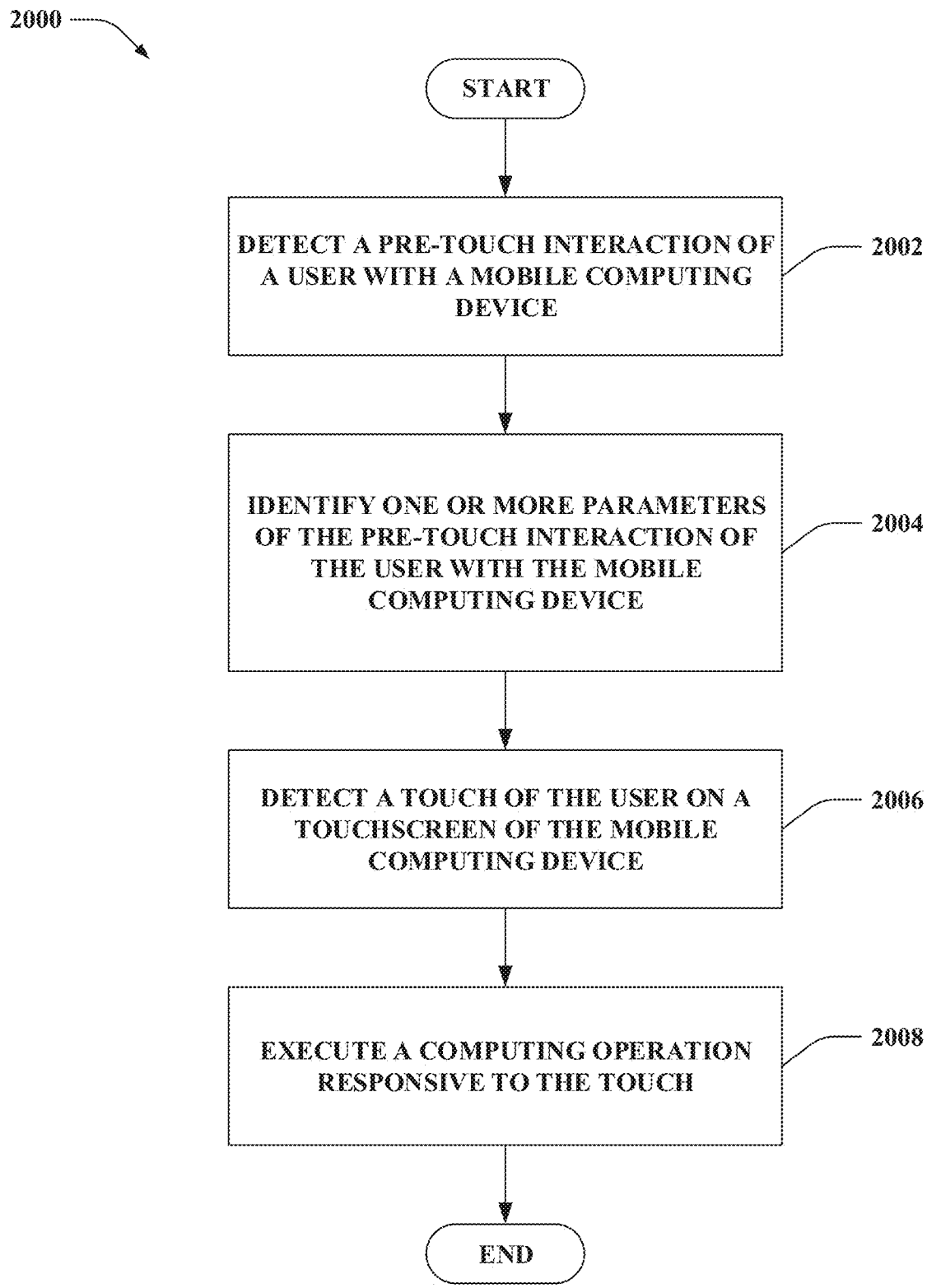
FIG. 20 is a flow diagram that illustrates an exemplary methodology of controlling execution of a computing operation performed by a mobile computing device.
Figure 21:
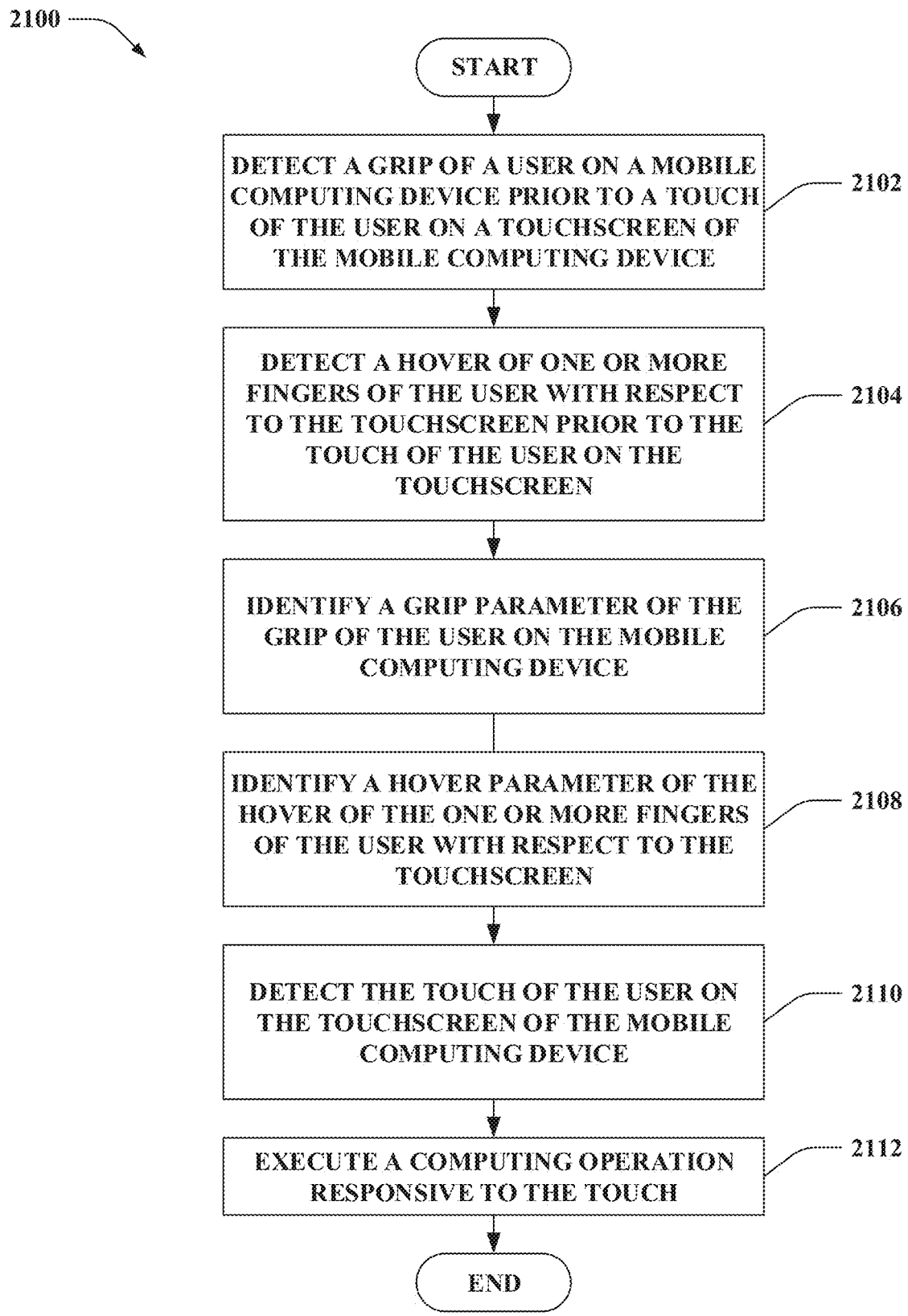
FIG. 21 is a flow diagram that illustrates another exemplary methodology of controlling execution of a computing operation performed by a mobile computing device.
Figure 22:
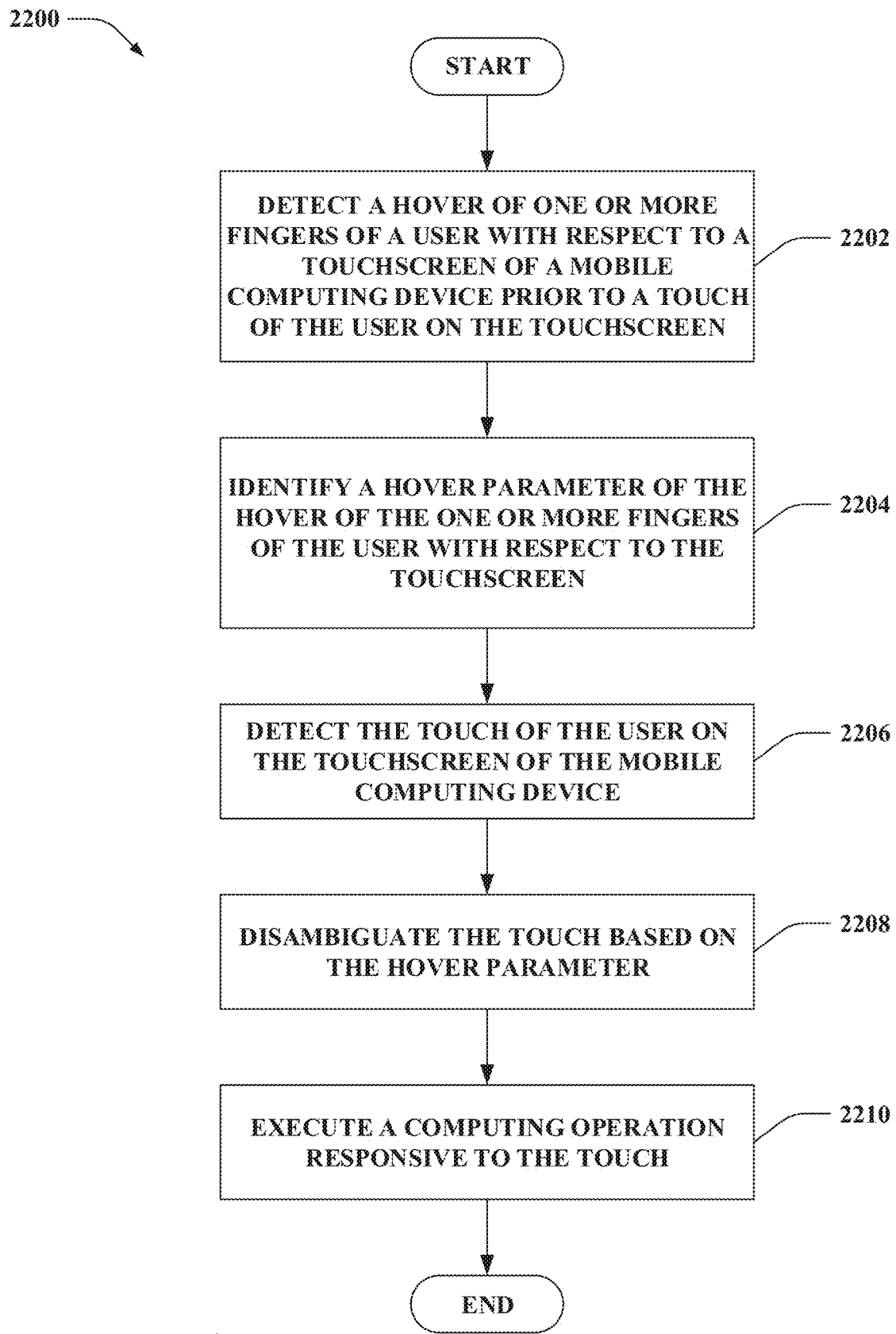
FIG. 22 is a flow diagram that illustrates yet another exemplary methodology of controlling execution of a computing operation performed by a mobile computing device.

FIGS. 20-22 illustrate exemplary methodologies relating to controlling execution of a computing operation performed by a mobile computing device based on a sensed pre-touch interaction of a user with the mobile computing device. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 20 illustrates a methodology 2000 of controlling execution of a computing operation performed by a mobile computing device. At 2002, a pre-touch interaction of a user with the mobile computing device can be detected. The pre-touch interaction can include a grip of the user on the mobile computing device and/or a hover of one or more fingers of the user with respect to a touchscreen of the mobile computing device. The one or more fingers of the user can be within proximity but not touching the touchscreen as part of the hover. At 2004, one or more parameters of the pre-touch interaction of the user with the mobile computing device can be identified. At 2006, a touch of the user on the touchscreen of the mobile computing device can be detected. At 2008, a computing operation can be executed responsive to the touch. The computing operation can be based on the touch and the one or more parameters of the pre-touch interaction of the user with the mobile computing device.

Turning to FIG. 21, illustrated is another exemplary methodology 2100 of controlling execution of a computing operation performed by a mobile computing device. At 2102, a grip of a user on the mobile computing device can be detected. The grip of the user can be detected prior to a touch of the user on a touchscreen of the mobile computing device. At 2104, a hover of one or more fingers of the user with respect to the touchscreen can be detected. The hover can be detected prior to the touch of the user on the touchscreen. Moreover, the one or more fingers of the user can be within proximity but not touching the touchscreen as part of the hover. At 2106, a grip parameter of the grip of the user on the mobile computing device can be identified. At 2108, a hover parameter of the hover of the one or more fingers of the user with respect to the touchscreen can be identified. At 2110, the touch of the user on the touchscreen of the mobile computing device can be detected. At 2112, a computing operation can be executed responsive to the touch. The computing operation can be based on the touch, the grip parameter, and hover parameter.

Referring now to FIG. 22, illustrated is yet another methodology 2200 of controlling execution of the computing operation performed by a mobile computing device. At 2202, a hover of one or more fingers of a user with respect to the touchscreen of the mobile computing device can be detected. The hover can be detected prior to a touch of the user on the touchscreen. Further, the one or more fingers of the user can be within proximity but not touching the touchscreen as part of the hover. At 2204, a hover parameter of the hover of the one or more fingers of the user with respect to the touchscreen can be identified. At 2206, the touch of the user on the touchscreen of the mobile computing device can be detected. At 2208, the touch can be disambiguated based on the hover parameter. At 2210, a computing operation can be executed responsive to the touch. The computing operation can be based on the touch as disambiguated.

Figure 23:
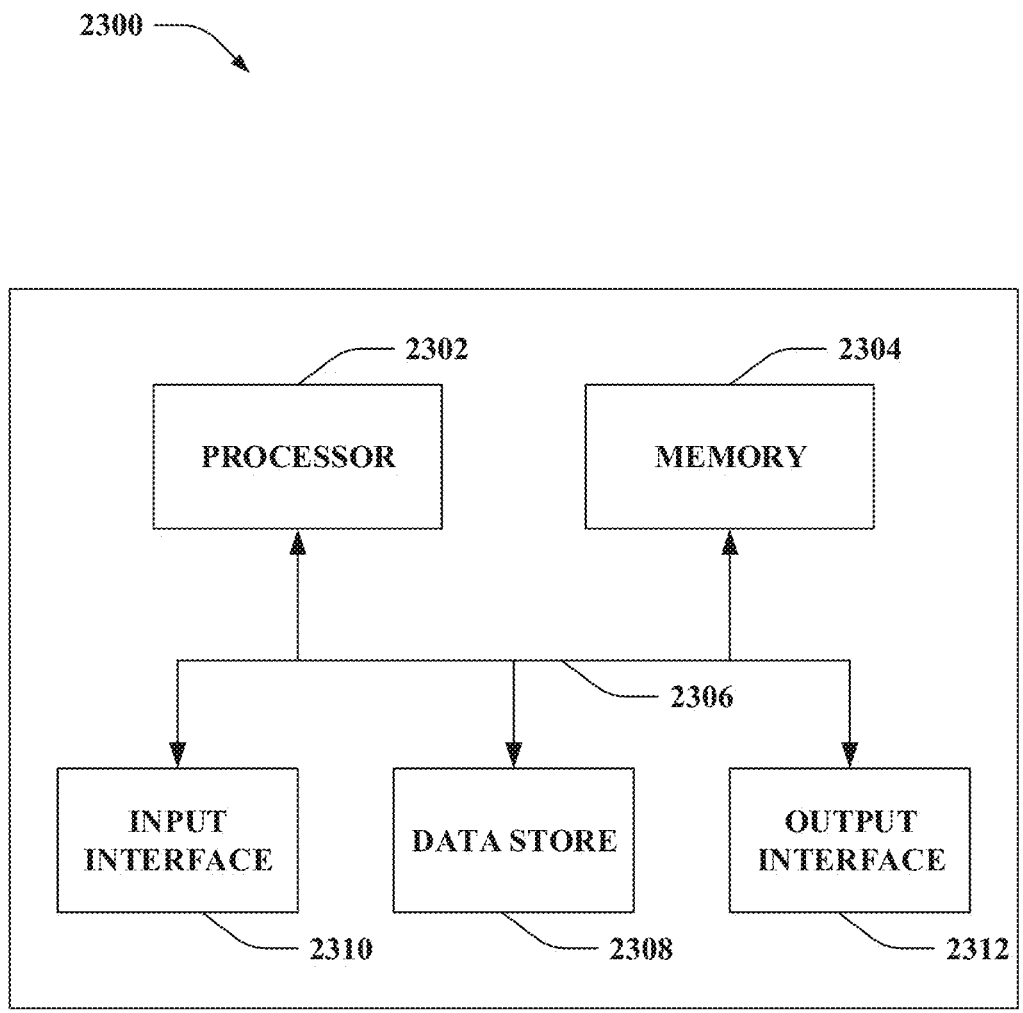
FIG. 23 illustrates an exemplary computing device.

Referring now to FIG. 23, a high-level illustration of an exemplary computing device 2300 that can be used in accordance with the systems and methodologies disclosed herein is illustrated. For instance, the computing device 2300 may be the mobile computing device 104. According to another example, the computing device 2300 may be or include the computing system 1902. Pursuant to yet a further example, the computing system 1902 can include the computing device 2300. The computing device 2300 includes at least one processor 2302 that executes instructions that are stored in a memory 2304. The instructions may be, for instance, instructions for implementing functionality described as being carried out by one or more components discussed above or instructions for implementing one or more of the methods described above. The processor 2302 may access the memory 2304 by way of a system bus 2306. In addition to storing executable instructions, the memory 2304 may also store parameters of pre-touch interactions, and so forth.

The computing device 2300 additionally includes a data store 2308 that is accessible by the processor 2302 by way of the system bus 2306. The data store 2308 may include executable instructions, parameters of pre-touch interactions, etc. The computing device 2300 also includes an input interface 2310 that allows external devices to communicate with the computing device 2300. For instance, the input interface 2310 may be used to receive instructions from an external computer device, from a user, etc. The computing device 2300 also includes an output interface 2312 that interfaces the computing device 2300 with one or more external devices. For example, the computing device 2300 may display text, images, etc. by way of the output interface 2312.

It is contemplated that the external devices that communicate with the computing device 2300 via the input interface 2310 and the output interface 2312 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 2300 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 2300 may be a distributed system. Thus, for instance, several devices may be in communication by way of a network connection and may collectively perform tasks described as being performed by the computing device 2300.

Figure 24:
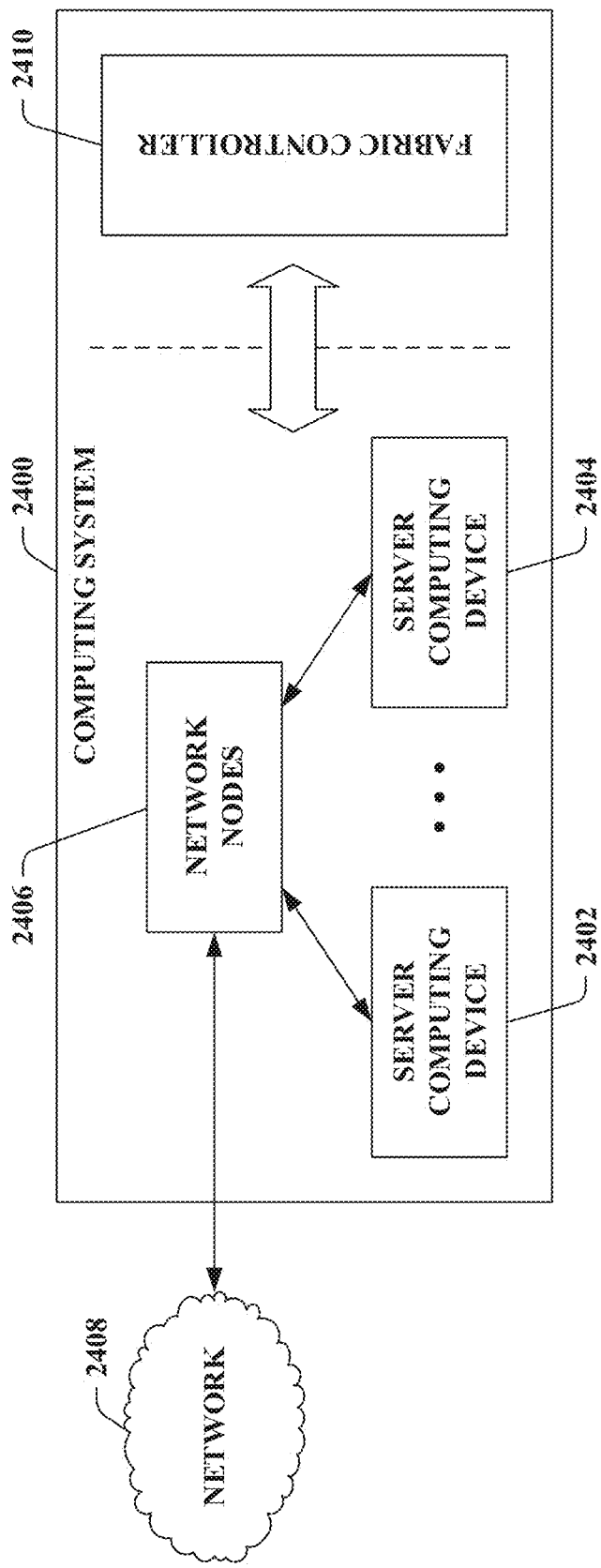
FIG. 24 illustrates an exemplary computing system.

Turning to FIG. 24, a high-level illustration of an exemplary computing system 2400 that can be used in accordance with the systems and methodologies disclosed herein is illustrated. For instance, the computing system 2400 can be or include the computing system 1902. Additionally or alternatively, the computing system 1902 can be or include the computing system 2400.

The computing system 2400 includes a plurality of server computing devices, namely, a server computing device 2402, . . . , and a server computing device 2404 (collectively referred to as server computing devices 2402-2404). The server computing device 2402 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 2402, at least a subset of the server computing devices 2402-2404 other than the server computing device 2402 each respectively include at least one processor and a memory. Moreover, at least a subset of the server computing devices 2402-2404 include respective data stores.

Processor(s) of one or more of the server computing devices 2402-2404 can be or include the processor 1904. Further, a memory (or memories) of one or more of the server computing devices 2402-2404 can be or include the memory 1906.

The computing system 2400 further includes various network nodes 2406 that transport data between the server computing devices 2402-2404. Moreover, the network nodes 2402 transport data from the server computing devices 2402-2404 to external nodes (e.g., external to the computing system 2400) by way of a network 2408. The network nodes 2402 also transport data to the server computing devices 2402-2404 from the external nodes by way of the network 2408. The network 2408, for example, can be the Internet, a cellular network, or the like. The network nodes 2406 include switches, routers, load balancers, and so forth.

A fabric controller 2410 of the computing system 2400 manages hardware resources of the server computing devices 2402-2404 (e.g., processors, memories, data stores, etc. of the server computing devices 2402-2404). The fabric controller 2410 further manages the network nodes 2406. Moreover, the fabric controller 2410 manages creation, provisioning, de-provisioning, and supervising of virtual machines instantiated upon the server computing devices 2402-2404.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A mobile computing device, comprising:
a touchscreen;
at least one processor; and
memory that comprises computer-executable instructions that, when executed by the at least one processor, cause the at least one processor to perform acts including:
detecting a pre-touch interaction of a user with the mobile computing device, the pre-touch interaction comprises a hover of one or more fingers of the user with respect to the touchscreen, the one or more fingers of the user being within proximity but not touching the touchscreen as part of the hover;
identifying one or more parameters of the pre-touch interaction of the user with the mobile computing device, the one or more parameters of the pre-touch interaction comprising an indication whether an approach trajectory of the one or more fingers of the user includes an adjustment, the approach trajectory includes the adjustment when the one or more fingers are within a predefined distance from the touchscreen for longer than a threshold period of time before contact with the touchscreen;
detecting a location of a touch of the user on a two-dimensional planar surface of the touchscreen of the mobile computing device; and
executing a computing operation responsive to the touch, an identity of the computing operation executed responsive to the touch being controlled based on the location of the touch on the two-dimensional planar surface of the touchscreen and the indication whether the approach trajectory of the one or more fingers of the user includes the adjustment.

2. The mobile computing device of claim 1, wherein:
the pre-touch interaction further comprises a grip of the user on the mobile computing device;
identifying the one or more parameters of the pre-touch interaction of the user with the mobile computing device further comprises:
identifying a grip parameter of the grip of the user on the mobile computing device; and
identifying a hover parameter of the hover of the one or more fingers of the user with respect to the touchscreen; and
the identity of the computing operation executed responsive to the touch further being controlled based on the grip parameter and the hover parameter.

3. The mobile computing device of claim 1, wherein the memory further comprises computer-executable instructions that, when executed by the at least one processor, cause the at least one processor to perform acts including:
detecting a physical orientation of the mobile computing device;
wherein the identity of the computing operation executed responsive to the touch is further controlled based on the physical orientation of the mobile computing device.

4. The mobile computing device of claim 1, wherein the memory further comprises computer-executable instructions that, when executed by the at least one processor, cause the at least one processor to perform acts including:
prior to the touch, modifying a graphical user interface displayed on the touchscreen based on the one or more parameters of the pre-touch interaction of the user with the mobile computing device, wherein the graphical user interface as modified comprises a control that causes execution of the computing operation.

5. The mobile computing device of claim 4, wherein modifying the graphical user interface displayed on the touchscreen based on the one or more parameters of the pre-touch interaction of the user with the mobile computing device further comprises:
fading a set of controls into the graphical user interface displayed on the touchscreen responsive to the one or more parameters of the pre-touch interaction specifying that the one or more fingers are approaching the touchscreen prior to the touch, wherein the set of controls comprises the control that causes the execution of the computing operation.

6. The mobile computing device of claim 5, wherein the memory further comprises computer-executable instructions that, when executed by the at least one processor, cause the at least one processor to perform acts including:
selecting the set of controls to be faded into the graphical user interface based on the one or more parameters of the pre-touch interaction, wherein:
a first set of controls is selected responsive to the one or more parameters of the pre-touch interaction specifying that the mobile computing device is gripped in a left hand of the user;
a second set of controls is selected responsive to the one or more parameters of the pre-touch interaction specifying that the mobile computing device is gripped in a right hand of the user;
a third set of controls is selected responsive to the one or more parameters of the pre-touch interaction specifying that the mobile computing device is gripped in both the left hand and the right hand of the user; and
a fourth set of controls is selected responsive to the one or more parameters of the pre-touch interaction specifying that the mobile computing device is neither gripped in the left hand nor gripped in the right hand of the user.

7. The mobile computing device of claim 5, wherein the memory further comprises computer-executable instructions that, when executed by the at least one processor, cause the at least one processor to perform acts including:
  selecting the set of controls to be faded into the graphical user interface based on the one or more parameters of the pre-touch interaction, wherein:
    a first set of controls is selected responsive to the one or more parameters of the pre-touch interaction specifying that a thumb of the user is approaching the touchscreen; and
    a second set of controls is selected responsive to the one or more parameters of the pre-touch interaction specifying that a finger other than a thumb of the user is approaching the touchscreen.

8. The mobile computing device of claim 4, wherein modifying the graphical user interface displayed on the touchscreen based on the one or more parameters of the pre-touch interaction of the user with the mobile computing device further comprises:
  selectively revealing user interface affordances as part of the graphical user interface responsive to the one or more parameters of the pre-touch interaction specifying that the one or more fingers are approaching the touchscreen prior to the touch, wherein the user interface affordances that are selectively revealed correspond to posture of the one or more fingers, and wherein the user interface affordances that are selectively revealed comprise a user interface affordance that causes execution of the computing operation.

9. The mobile computing device of claim 1, wherein the memory further comprises computer-executable instructions that, when executed by the at least one processor, cause the at least one processor to perform acts including:
  disambiguating the touch based on the one or more parameters of the pre-touch interaction of the user with the mobile computing device, wherein the identity of the computing operation executed responsive to the touch is controlled based on the touch as disambiguated.

10. The mobile computing device of claim 9, wherein the touch is disambiguated based on the indication specifying whether the approach trajectory of the one or more fingers of the user includes the adjustment, wherein the approach trajectory leads to the touch of the user on the two-dimensional planar surface of the touchscreen of the mobile computing device.

11. The mobile computing device of claim 9, wherein disambiguating the touch based on the one or more parameters of the pre-touch interaction of the user with the mobile computing device further comprises:
  detecting a type of gesture of which the touch is part based on the approach trajectory leading to the touch of the user on the two-dimensional planar surface of the touchscreen of the mobile computing device.

12. The mobile computing device of claim 9, wherein disambiguating the touch based on the one or more parameters of the pre-touch interaction of the user with the mobile computing device further comprises:
  detecting a particular graphical target, from a plurality of graphical targets, included in a graphical user interface displayed on the touchscreen intended to be touched by the user based on the approach trajectory of the one or more figures of the user leading to the touch of the one or more fingers of the user on the two-dimensional planar surface of the touchscreen of the mobile computing device.

13. The mobile computing device of claim 1, wherein:
  the pre-touch interaction of the user with the mobile computing device is detected based on sensed data obtained by the touchscreen; and
  the touch of the user is detected based on the sensed data obtained by the touchscreen.

14. The mobile computing device of claim 1, wherein the memory further comprises computer-executable instructions that, when executed by the at least one processor, cause the at least one processor to perform acts including:
  while the touch of the user is detected:
    detecting a concurrent hover of one or more fingers of the user other than a finger currently touching the touchscreen;
    identifying one or more parameters of the concurrent hover;
    detecting a location of a differing touch of the user on the two-dimensional planar surface of the touchscreen of the mobile computing device; and
    executing a differing computing operation responsive to the differing touch, the identity of the differing computing operation executed responsive to the differing touch being controlled based on the location of the differing touch on the two-dimensional planar surface of the touchscreen and the one or more parameters of the concurrent hover.

15. A method of controlling execution of a computing operation performed by a mobile computing device, comprising:
  detecting a grip of a user on the mobile computing device prior to a touch of the user on a touchscreen of the mobile computing device;
  detecting a hover of one or more fingers of the user with respect to the touchscreen prior to the touch of the user on the touchscreen, the one or more fingers of the user being within proximity but not touching the touchscreen as part of the hover;
  identifying a grip parameter of the grip of the user on the mobile computing device;
  identifying a hover parameter of the hover of the one or more fingers of the user with respect to the touchscreen, the hover parameter specifies whether an approach trajectory of the one or more fingers of the user includes an adjustment, the approach trajectory includes the adjustment when the one or more fingers are within a predefined distance from the touchscreen for longer than a threshold period of time before contact with the touchscreen;
  detecting the touch of the user on the touchscreen of the mobile computing device, wherein a location of the touch on a two-dimensional planar surface of the touchscreen is detected; and
  executing the computing operation responsive to the touch, an identity of the computing operation executed responsive to the touch being controlled based on the location of the touch on the two-dimensional planar surface of the touchscreen, the grip parameter, and the hover parameter.

16. The method of claim 15, further comprising:
  prior to the touch, modifying a graphical user interface displayed on the touchscreen based on the grip parameter and the hover parameter, wherein the graphical user interface as modified comprises a control that causes execution of the computing operation.

17. The method of claim 15, further comprising:
  disambiguating the touch based on the grip parameter and the hover parameter, wherein the identity of the computing operation executed responsive to the touch is controlled based on the touch as disambiguated.

18. The method of claim 15, further comprising:
while the touch of the user is detected:
- detecting a concurrent hover of one or more fingers of the user other than a finger currently touching the touchscreen;
- identifying a concurrent hover parameter of the concurrent hover;
- detecting a location of a differing touch of the user on the two-dimensional planar surface of the touchscreen of the mobile computing device; and
- executing a differing computing operation responsive to the differing touch, an identity of the differing computing operation executed responsive to the differing touch being controlled based on the location of the differing touch on the two-dimensional planar surface of the touchscreen and the concurrent hover parameter.

19. The method of claim 15, wherein:
the grip parameter specifies at least one of:
- whether the mobile computing device is gripped by the user;
- whether the mobile computing device is gripped by the user in one hand or two hands; or
- an identity of a hand in which the mobile computing device is gripped by the user; and the hover parameter further specifies at least one of:
- a number of fingers hovering within proximity of the touchscreen;
- a location on the touchscreen above which a fingertip of a particular finger of the user is hovering;
- an altitude of the particular finger of the user above the touchscreen; or
- a posture of the particular finger of the user.

20. A method of controlling execution of a computing operation performed by a mobile computing device, comprising:
- detecting a hover of one or more fingers of a user with respect to a touchscreen of the mobile computing device prior to a touch of the user on the touchscreen, the one or more fingers of the user being within proximity but not touching the touchscreen as part of the hover;
- identifying a hover parameter of the hover of the one or more fingers of the user with respect to the touchscreen, the hover parameter comprises an indication whether an approach trajectory of the one or more fingers of the user includes an adjustment, the approach trajectory touchscreen for loner than a threshold period of time before contact with the touchscreen;
- detecting the touch of the user on the touchscreen of the mobile computing device, wherein the touch is on a two-dimensional planar surface of the touchscreen;
- disambiguating the touch on the two-dimensional planar surface of the touchscreen based on the hover parameter such that a particular graphical target, from a plurality of graphical targets, included in a graphical user interface displayed on the touchscreen intended to be touched by the user is detected; and
- executing the computing operation responsive to the touch, an identity of the computing operation being based on the touch on the two-dimensional planar surface of the touchscreen as disambiguated.

* * * * *